United States Patent
Yonemura et al.

(10) Patent No.: US 7,053,898 B2
(45) Date of Patent: May 30, 2006

(54) PICTURE DRAWING SYSTEM FOR USE WITH A COMPUTER AND A PICTURE DRAWING METHOD

(75) Inventors: Takaku Yonemura, Fukui (JP); Hiroyuki Watanabe, Tokyo (JP)

(73) Assignee: Yugen Kaishs Origin, Tokyo (JP)

( * ) Notice: Subject to any disclaimer, the term of this patent is extended or adjusted under 35 U.S.C. 154(b) by 275 days.

(21) Appl. No.: 10/101,165

(22) Filed: Mar. 20, 2002

(65) Prior Publication Data

US 2002/0145608 A1    Oct. 10, 2002

Related U.S. Application Data

(63) Continuation-in-part of application No. 09/292,749, filed on Apr. 16, 1999, now abandoned.

(30) Foreign Application Priority Data

Apr. 16, 1998  (JP)  ................... 10-142010

(51) Int. Cl.
  *G06T 11/00* (2006.01)
(52) U.S. Cl. ..................... 345/467; 345/636
(58) Field of Classification Search ................ 345/636, 345/619, 625, 634, 649, 650, 656, 667, 682, 345/467, 472.3, 686, 471
  See application file for complete search history.

(56) References Cited

U.S. PATENT DOCUMENTS

| | | | |
|---|---|---|---|
| 5,316,485 A | 5/1994 | Hirose | 434/322 |
| 5,426,729 A * | 6/1995 | Parker | 345/441 |
| 5,459,832 A * | 10/1995 | Wolf et al. | 715/769 |
| 5,463,729 A * | 10/1995 | Kitaguchi et al. | 398/91 |
| 5,468,077 A * | 11/1995 | Motokado et al. | 400/76 |
| 5,808,600 A * | 9/1998 | Mochizuki | 345/467 |
| 5,895,475 A * | 4/1999 | Eisenberg | 715/517 |
| 5,940,084 A * | 8/1999 | Motokado et al. | 345/468 |
| 5,974,198 A * | 10/1999 | Hamburg et al. | 382/284 |
| 5,982,394 A | 11/1999 | Takahiro | 345/508 |
| 5,986,670 A | 11/1999 | Dries et al. | 345/435 |
| 6,130,676 A | 10/2000 | Wise et al. | 345/433 |
| 6,161,116 A * | 12/2000 | Saltzman | 715/535 |
| 6,177,935 B1 | 1/2001 | Munn | 345/335 |
| 6,236,407 B1 * | 5/2001 | Leban et al. | 345/630 |

OTHER PUBLICATIONS

Watt, Allen. "Allen Watt's Word Tips" Copyright © 2005 (However establishes that Image Flip is a well known method, e.g. Microsoft Word 97, copyright © 1997).*

* cited by examiner

*Primary Examiner*—Richard Hjerpe
*Assistant Examiner*—Michelle K. Lay
(74) *Attorney, Agent, or Firm*—Wenderoth, Linda & Ponank, L.L.P.

(57) ABSTRACT

A system and method for use with a computer having a memory for drawing a picture on a display of the computer which comprises a plurality of geometric parts stored as fonts in the memory, each font having a code number, the geometric part fonts, and a finished picture assembled by the picture parts whereby the encoded parts and the finished pictures can be stored in the memory systematically, exchangeably and removably by coded numbers.

12 Claims, 47 Drawing Sheets to select from here
for making a picture to assemble a picture using these parts

FIG. 18b

Grass

| Picture parts Code No. : 510 |
|---|

| Layer | Parts Code No. | Color Table No. | Coordinates | | Size | | Rotation | reversed | Geometric figure |
|---|---|---|---|---|---|---|---|---|---|
| | | | X | Y | X | Y | | | |
| 0 | 1 | 0:01 | 55 | 144 | 186 | 72 | 0 | 0 | □ |
| 1 | 61 | 2:03 | 71 | 70 | 72 | 138 | 0 | 0 | △ |
| 2 | 61 | 4:05 | 96 | 59 | 72 | 138 | 0 | 0 | △ |
| 3 | 61 | 6:07 | 127 | 49 | 72 | 154 | 0 | 0 | △ |
| 4 | 61 | 8:09 | 163 | 83 | 54 | 96 | 0 | 0 | △ |

FIG. 18c

Color Table

| Color Table No. | Position X | Position Y | Color Code |
|---|---|---|---|
| 0 | -33 | 8 | 0 |
| 1 | -44 | 16 | 11 |
| 2 | -2 | 20 | 0 |
| 3 | -6 | 32 | 11 |
| 4 | -2 | 20 | 0 |
| 5 | -6 | 32 | 11 |
| 6 | -2 | 20 | 0 |
| 7 | -6 | 32 | 11 |
| 8 | -2 | 20 | 0 |
| 9 | -6 | 32 | 11 |

FIG. 18e

| Decoded Color code | |
|---|---|
| 0 | black |
| 1 | gray |
| 2 | white |
| 3 | yellow |
| 4 | flesh |
| 5 | orange |
| 6 | shine red |
| 7 | pink |
| 8 | peach |
| 9 | sky blue |
| 10 | cobalt |
| 11 | yellow green |
| 12 | light green |
| 13 | purple |
| 14 | brown |
| 15 | transparency |

FIG. 19b

Frog

Picture Parts Code No. : 501

| Layer | Parts Code No. | Color Table No. | Coordinates X | Coordinates Y | Size X | Size Y | Rotation | Reversed | Geometric Figure |
|---|---|---|---|---|---|---|---|---|---|
| 0 | 4 | 0:01 | 56 | 29 | 102 | 102 | 0 | 0 | ○ |
| 1 | 4 | 2:03 | 155 | 31 | 102 | 102 | 0 | 0 | ○ |
| 2 | 4 | 4:05 | 47 | 58 | 210 | 166 | 0 | 0 | ○ |
| 3 | 4 | 6:07 | 69 | 160 | 160 | 118 | 0 | 0 | ○ |
| 4 | 61 | 8:09 | 20 | 203 | 168 | 72 | 0 | 0 | △ |
| 5 | 61 | 10:11 | 107 | 203 | 168 | 72 | 0 | 1 | △ |
| 6 | 4 | 12 | 92 | 69 | 34 | 34 | 0 | 0 | ○ |
| 7 | 4 | 13 | 184 | 73 | 34 | 34 | 0 | 0 | ○ |
| 8 | 4 | 14:15 | 95 | 121 | 120 | 72 | 0 | 0 | ○ |
| 9 | 4 | 16:17 | 106 | 208 | 88 | 40 | 0 | 0 | ○ |

FIG. 19c

Color Table

| Color Table No. | Position X | Position Y | Color Code |
|---|---|---|---|
| 0 | -16 | 6 | 0 |
| 1 | -32 | 4 | 12 |
| 2 | -16 | 6 | 0 |
| 3 | -32 | 4 | 12 |
| 4 | -16 | 6 | 0 |
| 5 | -32 | 4 | 12 |
| 6 | -16 | 6 | 0 |
| 7 | -32 | 4 | 12 |
| 8 | -22 | 24 | 0 |
| 9 | -24 | 26 | 12 |
| 10 | -22 | 24 | 0 |
| 11 | -24 | 26 | 12 |
| 12 | -16 | 8 | 0 |
| 13 | -16 | 8 | 0 |
| 14 | -12 | 4 | 0 |
| 15 | 20 | 6 | 2 |
| 16 | -12 | 4 | 0 |
| 17 | 20 | 6 | 2 |

FIG. 19e

| Decoded Color code | |
|---|---|
| 0 | black |
| 1 | gray |
| 2 | white |
| 3 | yellow |
| 4 | flesh |
| 5 | orange |
| 6 | shine red |
| 7 | pink |
| 8 | peach |
| 9 | sky blue |
| 10 | cobalt |
| 11 | yellow green |
| 12 | light green |
| 13 | purple |
| 14 | brown |
| 15 | transparency |

FIG. 20b

Giraffe

Picture Parts CodeNo. : 509

| Layer | Parts Code No. | Color Table No. | Coordinates | | Size | | Rotation | Reversed | Geometric figure |
|---|---|---|---|---|---|---|---|---|---|
| | | | X | Y | X | Y | | | |
| 0 | 4 | 4:05 | 60 | 115 | 252 | 92 | 0 | 0 | ◯ |
| 1 | 80 | 35:36:00 | 66 | -6 | 36 | 48 | 0 | 3 | ◊ |
| 2 | 73 | 39:40:00 | 80 | 10 | 14 | 20 | 335 | 2 | ⌒ |
| 3 | 68 | 0:01 | 22 | 5 | 106 | 72 | 75 | 0 | ◯ |
| 4 | 69 | 2:03 | 73 | 10 | 72 | 166 | 340 | 0 | ⌂ |
| 5 | 80 | 33:34:00 | 83 | 3 | 36 | 48 | 0 | 3 | ◊ |
| 6 | 73 | 37:38:00 | 86 | 10 | 14 | 20 | 335 | 2 | ⌒ |
| 7 | 4 | 41:42:00 | 90 | 4 | 8 | 8 | 0 | 0 | ◯ |
| 8 | 4 | 43:44:00 | 84 | 6 | 8 | 8 | 0 | 0 | ◯ |
| 9 | 69 | 45:46:00 | 89 | 50 | 20 | 30 | 350 | 0 | ⌂ |
| 10 | 69 | 47:48:00 | 92 | 75 | 20 | 30 | 350 | 0 | ⌂ |
| 11 | 69 | 49:50:00 | 95 | 102 | 20 | 30 | 350 | 0 | ⌂ |
| 12 | 69 | 51:52:00 | 99 | 127 | 20 | 30 | 350 | 0 | ⌂ |
| 13 | 80 | 53 | 64 | 22 | 28 | 20 | 85 | 0 | ◊ |
| 14 | 4 | 54 | 74 | 27 | 10 | 10 | 0 | 0 | ◯ |
| 15 | 72 | 56:57:00 | 142 | 133 | 20 | 20 | 35 | 0 | ⌒ |
| 16 | 72 | 64:65 | 134 | 148 | 20 | 20 | 35 | 0 | ⌒ |
| 17 | 72 | 58:59:00 | 171 | 132 | 16 | 16 | 35 | 0 | ⌒ |
| 18 | 72 | 66:67 | 164 | 147 | 16 | 16 | 35 | 0 | ⌒ |
| 19 | 72 | 68:69 | 189 | 150 | 14 | 14 | 50 | 0 | ⌒ |
| 20 | 72 | 60:61 | 199 | 134 | 16 | 16 | 50 | 0 | ⌒ |
| 21 | 72 | 62:63 | 219 | 137 | 16 | 16 | 55 | 0 | ⌒ |
| 22 | 72 | 70:71 | 216 | 149 | 16 | 16 | 55 | 0 | ⌒ |
| 23 | 68 | 10:11 | 128 | 140 | 82 | 106 | 0 | 0 | ◯ |
| 24 | 68 | 6:07 | 97 | 146 | 86 | 106 | 0 | 0 | ◯ |
| 25 | 68 | 8:09 | 180 | 149 | 86 | 106 | 0 | 0 | ◯ |
| 26 | 68 | 12:13 | 216 | 137 | 72 | 106 | 0 | 0 | ◯ |
| 27 | 69 | 14:15 | 126 | 219 | 28 | 72 | 0 | 2 | ⌂ |
| 28 | 69 | 16:17 | 155 | 208 | 28 | 72 | 0 | 2 | ⌂ |
| 29 | 69 | 18:19 | 208 | 218 | 28 | 72 | 0 | 2 | ⌂ |
| 30 | 69 | 20:21 | 237 | 203 | 28 | 72 | 0 | 2 | ⌂ |
| 31 | 65 | 22:23 | 123 | 252 | 30 | 48 | 0 | 1 | ▱ |
| 32 | 65 | 24:25:00 | 152 | 243 | 30 | 48 | 0 | 1 | ▱ |
| 33 | 65 | 26:27:00 | 205 | 253 | 30 | 48 | 0 | 1 | ▱ |
| 34 | 65 | 28:29:00 | 234 | 241 | 30 | 48 | 0 | 1 | ▱ |
| 35 | 77 | 30 | 238 | 139 | 72 | 72 | 10 | 0 | ⌐ |
| 36 | 74 | 31:32:00 | 273 | 183 | 14 | 30 | 0 | 2 | ᗩ |
| 37 | 25 | 72 | 106 | 165 | 62 | 30 | 0 | 0 | ⋁ |
| 38 | 25 | 73 | 190 | 168 | 62 | 30 | 0 | 0 | ⋁ |
| 39 | 3 | 55:74 | 38 | 9 | 34 | 72 | 355 | 0 | — |

FIG. 20c

Color Table

| Color Table No. | Position X | Position Y | Color Code |
|---|---|---|---|
| 0 | -12 | 12 | 0 |
| 1 | 3 | -12 | 4 |
| 2 | -18 | 2 | 0 |
| 3 | -10 | -8 | 4 |
| 4 | -18 | 6 | 0 |
| 5 | -16 | -3 | 4 |
| 6 | -6 | -12 | 0 |
| 7 | 8 | 12 | 4 |
| 8 | -6 | -12 | 0 |
| 9 | 8 | 12 | 4 |
| 10 | -6 | -12 | 0 |
| 11 | 8 | 12 | 4 |
| 12 | -6 | -12 | 0 |
| 13 | 8 | 12 | 4 |
| 14 | -18 | 12 | 0 |
| 15 | -6 | 0 | 4 |
| 16 | -18 | 12 | 0 |
| 17 | -6 | 0 | 4 |
| 18 | -18 | 12 | 0 |
| 19 | -6 | 0 | 4 |
| 20 | -18 | 12 | 0 |
| 21 | -6 | 0 | 4 |
| 22 | 12 | 0 | 1 |
| 23 | -6 | 12 | 0 |
| 24 | 12 | 0 | 1 |
| 25 | -6 | 12 | 0 |
| 26 | 12 | 0 | 1 |
| 27 | -6 | 12 | 0 |
| 28 | 12 | 0 | 1 |
| 29 | 10 | -10 | 0 |
| 30 | 10 | 14 | 1 |
| 31 | -24 | 18 | 0 |
| 32 | 6 | -6 | 5 |
| 33 | -6 | -12 | 0 |
| 34 | 6 | -6 | 5 |
| 35 | -6 | -12 | 0 |
| 36 | 6 | -12 | 5 |
| 37 | 0 | -20 | 0 |
| 38 | -12 | 2 | 1 |
| 39 | 0 | -20 | 0 |
| 40 | -12 | 2 | 1 |
| 41 | -28 | -6 | 0 |
| 42 | -34 | 12 | 1 |
| 43 | -28 | -6 | 0 |
| 44 | -34 | 12 | 1 |
| 45 | 2 | 6 | 0 |
| 46 | -6 | 8 | 5 |
| 47 | 2 | 6 | 0 |
| 48 | -6 | 8 | 5 |
| 49 | 2 | 6 | 0 |
| 50 | -6 | 8 | 5 |
| 51 | 2 | 6 | 0 |
| 52 | -6 | 8 | 2 |
| 53 | 1 | -10 | 0 |
| 54 | -4 | 10 | 1 |
| 55 | 21 | -2 | 0 |
| 56 | -22 | 10 | 5 |
| 57 | -18 | 12 | 0 |
| 58 | -22 | 10 | 5 |
| 59 | -18 | 12 | 0 |
| 60 | -22 | 10 | 5 |
| 61 | -18 | 12 | 0 |
| 62 | -22 | 10 | 5 |
| 63 | -18 | 12 | 0 |
| 64 | -22 | 10 | 5 |
| 65 | -18 | 12 | 0 |
| 66 | -22 | 10 | 5 |
| 67 | -18 | 12 | 0 |
| 68 | -22 | 10 | 5 |
| 69 | -18 | 12 | 0 |
| 70 | -22 | 10 | 5 |
| 71 | -18 | 12 | 5 |
| 72 | -28 | -6 | 5 |
| 73 | -28 | -6 | 5 |
| 74 | -34 | 1 | 0 |

FIG. 20e

| Decoded Color code | |
|---|---|
| 0 | black |
| 1 | gray |
| 2 | white |
| 3 | yellow |
| 4 | flesh |
| 5 | orange |
| 6 | shine red |
| 7 | pink |
| 8 | peach |
| 9 | sky blue |
| 10 | cobalt |
| 11 | yellow green |
| 12 | light green |
| 13 | purple |
| 14 | brown |
| 15 | transparency |

FIG. 21b

Hippopotamus

| Picture Parts Code No.: 509 |

| Layer | Parts Code No. | Color Table No. | Coordinates | | Size | | Rotation | reversed | Geometric figure |
|---|---|---|---|---|---|---|---|---|---|
| | | | X | Y | X | Y | | | |
| 0 | 4 | 32 | 55 | 76 | 30 | 30 | 0 | 0 | |
| 1 | 4 | 31 | 91 | 99 | 42 | 42 | 0 | 0 | |
| 2 | 8 | 12:13 | 27 | 173 | 300 | 76 | 0 | 0 | |
| 3 | 8 | 10:11 | -37 | 170 | 300 | 76 | 0 | 0 | |
| 4 | 47 | 4:05 | 51 | 108 | 126 | 126 | 0 | 0 | |
| 5 | 11 | 0:01 | -5 | 61 | 152 | 72 | 0 | 2 | |
| 6 | 11 | 2:03 | 29 | 51 | 144 | 148 | 75 | 3 | |
| 7 | 47 | 8:09 | 36 | 108 | 278 | 126 | 0 | 0 | |
| 8 | 57 | 6 | 2 | 60 | 138 | 138 | 0 | 1 | |
| 9 | 57 | 16:17 | 22 | 81 | 96 | 96 | 0 | 1 | |
| 10 | 57 | 7 | 4 | 128 | 134 | 102 | 0 | 3 | |
| 11 | 57 | 18 | 47 | 159 | 30 | 8 | 0 | 3 | |
| 12 | 57 | 19 | 59 | 159 | 30 | 8 | 0 | 3 | |
| 13 | 57 | 20 | 72 | 159 | 30 | 8 | 0 | 3 | |
| 14 | 57 | 29 | 45 | 166 | 30 | 8 | 0 | 3 | |
| 15 | 57 | 28 | 43 | 173 | 30 | 8 | 0 | 3 | |
| 16 | 57 | 27 | 41 | 180 | 30 | 8 | 0 | 3 | |
| 17 | 57 | 26 | 59 | 166 | 30 | 8 | 0 | 3 | |
| 18 | 57 | 25 | 57 | 173 | 30 | 8 | 0 | 3 | |
| 19 | 57 | 24 | 54 | 179 | 30 | 8 | 0 | 3 | |
| 20 | 57 | 23 | 72 | 166 | 30 | 8 | 0 | 3 | |
| 21 | 57 | 22 | 70 | 173 | 30 | 8 | 0 | 3 | |
| 22 | 57 | 21 | 66 | 179 | 30 | 8 | 0 | 3 | |
| 23 | 4 | 30 | 56 | 184 | 14 | 14 | 0 | 0 | |
| 24 | 80 | 14 | 98 | 103 | 34 | 34 | 0 | 1 | |
| 25 | 4 | 15 | 111 | 115 | 10 | 10 | 0 | 0 | |
| 26 | 4 | 33 | 69 | 85 | 10 | 10 | 0 | 0 | |
| 27 | 4 | 34 | 60 | 85 | 10 | 10 | 0 | 0 | |

FIG. 21c

Color Table

| Color Table No | Position X | Position Y | Color Code |
|---|---|---|---|
| 0 | 2 | 10 | 0 |
| 1 | -6 | -4 | 14 |
| 2 | 9 | -3 | 0 |
| 3 | 3 | -1 | 14 |
| 4 | -18 | -2 | 0 |
| 5 | 2 | -14 | 14 |
| 6 | 5 | 5 | 9 |
| 7 | -4 | -1 | 9 |
| 8 | -2 | -6 | 0 |
| 9 | -6 | 2 | 14 |
| 10 | -20 | 51 | 0 |
| 11 | -49 | 68 | 10 |
| 12 | -20 | 51 | 0 |
| 13 | -49 | 68 | 10 |
| 14 | -8 | -13 | 2 |
| 15 | 10 | 0 | 0 |
| 16 | 5 | 5 | 9 |
| 17 | -6 | 8 | 4 |
| 18 | -4 | -1 | 9 |
| 19 | -4 | -1 | 9 |
| 20 | -4 | -1 | 9 |
| 21 | -4 | -1 | 9 |
| 22 | -4 | -1 | 9 |
| 23 | -4 | -1 | 9 |
| 24 | -4 | -1 | 9 |
| 25 | -4 | -1 | 9 |
| 26 | -4 | -1 | 9 |
| 27 | -4 | -1 | 9 |
| 28 | -4 | -1 | 9 |
| 29 | -4 | -1 | 9 |
| 30 | -2 | 16 | 1 |
| 31 | -17 | 3 | 14 |
| 32 | -4 | 14 | 14 |
| 33 | -26 | 0 | 0 |
| 34 | -26 | 0 | 0 |

FIG. 21e

| Decoded Color code | |
|---|---|
| 0 | black |
| 1 | gray |
| 2 | white |
| 3 | yellow |
| 4 | flesh |
| 5 | orange |
| 6 | shine red |
| 7 | pink |
| 8 | peach |
| 9 | sky blue |
| 10 | cobalt |
| 11 | yellow green |
| 12 | light green |
| 13 | purple |
| 14 | brown |
| 15 | transparency |

FIG. 22b

Tree

| Picture parts Code No. : 507 | | | | | | | | | |
|---|---|---|---|---|---|---|---|---|---|
| Layer | Parts code No. | Color Table No. | Coordinates | | Size | | Rotation | Reversed | Geometric Figure |
| | | | X | Y | X | Y | | | |
| 0 | 0:01 | 10 | 114 | 36 | 54 | 288 | 0 | 0 | |
| 1 | 2:03 | 1 | 90 | 122 | 100 | 20 | 0 | 0 | |
| 2 | 10:11 | 1 | 147 | 25 | 72 | 94 | 15 | 0 | |
| 3 | 8:09 | 1 | 121 | 27 | 72 | 94 | 15 | 0 | |
| 4 | 6:07 | 1 | 94 | 24 | 72 | 102 | 15 | 0 | |
| 5 | 4:05 | 1 | 61 | 31 | 72 | 92 | 15 | 0 | |

FIG. 22c

Color Table

| Color Table No. | Position X | Position Y | Color Code |
|---|---|---|---|
| 0 | -6 | -2 | 0 |
| 1 | -6 | 12 | 14 |
| 2 | -8 | 12 | 0 |
| 3 | 2 | 2 | 14 |
| 4 | -12 | -2 | 0 |
| 5 | 6 | 22 | 12 |
| 6 | -12 | -2 | 0 |
| 7 | 6 | 22 | 12 |
| 8 | -12 | -2 | 0 |
| 9 | 6 | 22 | 12 |
| 10 | -12 | -2 | 0 |
| 11 | 6 | 22 | 12 |

FIG. 22e

| Decoded Color code | |
|---|---|
| 0 | black |
| 1 | gray |
| 2 | white |
| 3 | yellow |
| 4 | flesh |
| 5 | orange |
| 6 | shine red |
| 7 | pink |
| 8 | peach |
| 9 | sky blue |
| 10 | cobalt |
| 11 | yellow green |
| 12 | light green |
| 13 | purple |
| 14 | brown |
| 15 | transparency |

FIG. 23b

Alligator

Picture Parts Code No.: 502

| Layer | Parts Code No. | Color Table No. | Coordinates | | Size | | Rotation | reversed | Geometric figure |
|---|---|---|---|---|---|---|---|---|---|
| | | | X | Y | X | Y | | | |
| 0 | 2 | 0 | 50 | 61 | 122 | 122 | 0 | 0 | △ |
| 1 | 2 | 1 | 84 | 68 | 114 | 114 | 0 | 0 | △ |
| 2 | 2 | 2 | 125 | 77 | 102 | 102 | 0 | 0 | △ |
| 3 | 2 | 3 | 158 | 84 | 94 | 94 | 0 | 0 | △ |
| 4 | 2 | 4 | 174 | 120 | 134 | 50 | 0 | 0 | △ |
| 5 | 4 | 5 | −15 | 105 | 152 | 72 | 0 | 0 | ○ |
| 6 | 4 | 6 | 85 | 141 | 94 | 50 | 0 | 0 | ○ |
| 7 | 4 | 7 | 172 | 147 | 86 | 42 | 0 | 0 | — |
| 8 | 3 | 8 | −3 | 95 | 100 | 100 | 0 | 0 | ○ |
| 9 | 4 | 9 | 44 | 83 | 56 | 56 | 0 | 0 | |
| 10 | 4 | | 56 | 99 | 30 | 30 | 0 | 0 | ○ |

FIG. 23c

Color Table

| Color Table No. | Position X | Position Y | Color Code |
|---|---|---|---|
| 0 | 0 | 15 | 3 |
| 1 | 0 | 15 | 3 |
| 2 | 0 | 15 | 3 |
| 3 | 0 | 15 | 3 |
| 4 | 0 | 15 | 3 |
| 5 | -20 | 2 | 3 |
| 6 | -20 | 2 | 3 |
| 7 | -20 | 2 | 3 |
| 8 | -8 | 22 | 3 |
| 9 | 28 | 22 | 0 |

FIG. 23e

| Decoded Color code | |
|---|---|
| 0 | black |
| 1 | gray |
| 2 | white |
| 3 | yellow |
| 4 | flesh |
| 5 | orange |
| 6 | shine red |
| 7 | pink |
| 8 | peach |
| 9 | sky blue |
| 10 | cobalt |
| 11 | yellow green |
| 12 | light green |
| 13 | purple |
| 14 | brown |
| 15 | transparency |

FIG. 24b

Final Picture Assembly

Final Picture Frame Code # 502

| Layer | Picture Parts Code No. | Coordinates | | Size | | Rotation | Reversed |
|---|---|---|---|---|---|---|---|
| | | X | Y | X | Y | | |
| 0 | 507 | 151 | -22 | 216 | 216 | 0 | 0 |
| 1 | 507 | 275 | -34 | 216 | 216 | 0 | 0 |
| 2 | 508 | -22 | 63 | 216 | 328 | 0 | 1 |
| 3 | 501 | 206 | 222 | 76 | 76 | 0 | 0 |
| 4 | 502 | 309 | 185 | 216 | 216 | 0 | 0 |
| 5 | 510 | -5 | 99 | 112 | 112 | 0 | 0 |
| 6 | 510 | 110 | 182 | 112 | 112 | 0 | 0 |
| 7 | 510 | 266 | 197 | 112 | 112 | 0 | 0 |
| 8 | 510 | 333 | 148 | 112 | 112 | 0 | 0 |
| 9 | 510 | 248 | 81 | 112 | 112 | 0 | 0 |
| 10 | 510 | 411 | 111 | 112 | 112 | 0 | 0 |
| 11 | 510 | 301 | 254 | 112 | 112 | 0 | 0 |
| 12 | 510 | 426 | 206 | 112 | 112 | 0 | 0 |
| 13 | 510 | 78 | 261 | 112 | 112 | 0 | 0 |
| 14 | 510 | 184 | 243 | 112 | 112 | 0 | 0 |
| 15 | 507 | -21 | -21 | 232 | 232 | 0 | 0 |
| 16 | 509 | 120 | 49 | 266 | 266 | 0 | 0 |

PICTURE DRAWING SYSTEM FOR USE WITH A COMPUTER AND A PICTURE DRAWING METHOD

This is a Continuation-In-Part application of Ser. No. 09/292,749, filed Apr. 16, 1999 now abandoned.

BACKGROUND OF THE INVENTION

1. Field of the Invention

This application is a continuation-in-part patent application of U.S. patent application Ser. No. 09/292,749 filed Apr. 16, 1999 now abandoned. The invention is a system and method for use with a computer for drawing a picture on a display of a computer enabling a user to get skilled in handling a computer by building the geometric picture parts of a picture on a display of the computer.

2. Description of the Prior Art

In the computer, various data such as letters and ideas are made by the same method of making a sentence as letter data or marks.

On the other hand, it is usual for those skilled in the art to arrange letters or sentences linearly, but in case of a picture, it is necessary to arrange the same on a plane.

The method of drawing the desired picture on a computer has been proposed, but according to the prior method, the desired pictures are stuck at random and fixed on a display of the computer by a bitmap or other image format.

In accordance with the prior clip art method, the picture parts are copied one by one from the first made picture with a mouse cursor or the like and dropped on a display of a computer in order to make the desired picture.

(1) According to the conventional image method, such as using bitmap images, the picture parts for drawing the desired picture are not stored systematically or exchangeably in a file of the computer personal computer on a display of a computer. Therefore, addition or amendment of the individual parts that make up the finished picture is impossible on a display of a computer, and any reuse of the picture, or parts of the picture, is difficult.

(2) In addition, it is very difficult for the common user of the computer, except for those skilled in the art, to drag freely the picture parts from the finished picture and to drop them on a display of the computer in order to draw the desired picture.

(3) Accordingly, it is next to impossible for an unskilled operator, beginner, young user of the computer, or disabled person to freely draw the desired picture on the display of the computer.

SUMMARY AND OBJECTS OF THE INVENTION

A principal object of this invention is to provide a system for use with a computer having a memory for drawing a picture on a display of the computer which comprises a plurality of geometric parts stored as encoded information in the form of geometric fonts in the memory, each font having a code number. The geometric part fonts can be used to create picture parts. The picture parts can be used to create a finished picture. The finished picture is assembled from the picture parts whereby the encoded parts and the finished pictures can be stored in the memory systematically, exchangeably and removably by coded numbers, not as conventional image files.

Another object of this invention is to provide a method for use with a computer having a memory for drawing a picture on a display of the computer which comprises a plurality of geometric parts stored as encoded information in the form of geometric fonts in the memory, each font having a code number, the geometric part fonts, and a finished picture assembled by the picture parts whereby the encoded parts and the finished pictures can be stored in the memory systematically, exchangeably and removably by coded numbers, not as conventional image files.

Another object of this invention is to provide a system for use with a computer having a memory for drawing a picture on a display on a computer whereby either a skilled or unskilled user of the computer can make the geometric parts of a creature or other picture subject into a plurality of the geometric parts fonts and a finished picture by encoding and/or decoding the geometric parts fonts into the memory of the computer.

Another object of this invention is to provide a system for use with a computer having a memory for drawing a picture on a display of a computer whereby an unskilled user can get skilled in handling the personal computer.

Another object of this invention is to provide a method for use with a computer having a memory for drawing a picture on a display of a computer whereby the desired picture is drawn on the display of the computer by dragging and dropping the geometric picture parts of a creature or other picture subject into the desired picture in a manner similar to playing with building blocks on a canvas.

Another object of this invention is to provide a system for use with a computer having a memory for drawing a picture on a display of a computer whereby the desired picture is drawn on the display of the computer by dragging and dropping the geometric picture parts of a creature or other picture subject into the desired picture in a manner similar to playing with building blocks on a canvas.

Another object of this invention is to provide a system, for use with a computer having a memory, for drawing a picture on a display of a computer wherein graphics are stored as encoded information, i.e., coded numbers, rather than as image files. An analogy can be made as follows. The parts of pictures can be thought of as being similar to fonts like those used conventionally for representing letters, words, which are combinations of letters, and sentences, which are combinations of words. In the present invention, simple geometric shapes, stored as coded numbers, are combined to form picture parts in a manner similar to the way in which letters, stored as ASCII codes, are combined to form words. The picture parts, which are also stored as coded numbers, are combined to form a finished picture in a manner similar to the way in which words are combined to form sentences. The actual image files of the shapes, parts, and pictures are not stored, but rather coded information is stored. This idea is similar to the way in which ASCII codes are used for letters, words, and sentences, where image files are not stored for each letter, word, and sentence in a completed document.

Another object of this invention is to provide a method, for use with a computer having a memory, for drawing a picture on a display of a computer whereby drawing of the desired picture can be easily carried out in a manner similar to the way in which writing is done on a word processor, thereby giving full play of a writer's imagination.

Another object of this invention is to provide a method, for use with a computer having a memory, for drawing a picture on a display of a computer whereby simplified pictures can be easily drawn irrespective of painting ability and/or ability to manipulate the computer.

Another object of this invention is to provide a method, for use with a computer having a memory, for drawing a picture on a display of a computer whereby a user of the computer can draw the desired picture easily and freely without having a preconception of a set picture.

Another object of this invention is to provide a system, for use with a computer having a memory, for drawing a picture on a display of the computer, which comprises an encoded picture assembled with an encoding or decoding method, thereby reducing significantly a capacity of the memory of the computer.

Still another object of this invention is to provide a method for use with a computer having a memory for drawing a picture on a display of a computer whereby the common and simple patterns of a creature or other picture subject can be systematically and exchangeably stored in a file of the computer as coded numbers.

An object of the present invention is a picture drawing system for use with a computer having a memory, wherein the picture drawing system comprises a material file, in the memory of the computer, storing simple geometric patterns, a part file, in the memory of the computer, storing at least one picture part comprised of encoded information of one or more of simple geometric patterns dragged and dropped from the material file. The picture part is stored in the memory in such a manner that each simple geometric pattern of the picture part is changeable so that the picture part is amendable and such that encoded information of additional geometric patterns from the material file can be added to the picture part, thereby adding additional geometric patterns to the picture part, and encoded information of one or more of the geometric patterns of the picture part can be removed, thereby removing the geometric pattern from the picture part. The picture drawing system also includes a finished picture file, in the memory of the computer, storing a finished picture comprised of encoded information of one or more of the picture parts that have been dragged and dropped from the part file by the user of the system. The finished picture is stored in the memory in such a manner that each picture part of the finished picture is changeable so that the finished picture is amendable and such that encoded information of additional picture parts from the part file can be added to the finished picture, thereby adding additional picture parts to the finished picture, and encoded information of one or more of the picture parts of the finished picture can be removed, thereby removing the picture part from the finished picture.

Another object of the present invention is a picture drawing method for use with a computer having a memory, wherein the picture drawing method comprises storing simple geometric patterns in a material file in the memory of the computer; forming at least one picture part by dragging and dropping one or more of the simple geometric patterns from the material file; storing the at least one picture part in a part file in the memory of the computer as encoded information of each of the simple geometric patterns of the picture part and storing the at least one picture part in such a manner that each simple geometric pattern of each picture part is changeable so that each picture part is amendable and such that encoded information of additional geometric patterns from the material file can be added to each picture part, thereby adding additional geometric patterns to the picture part, and encoded information of one or more of the geometric patterns of the picture part can be removed, thereby removing the geometric pattern from the picture part; forming a finished picture by dragging and dropping at least one picture part from the part file; and storing the finished picture in a finished picture file in the memory of the computer as encoded information of one or more of the at least one picture part and storing the finished picture part in such a manner that each picture part of the finished picture is changeable so that the finished picture is amendable and such that encoded information of additional picture parts from the part file can be added to the finished picture, thereby adding additional picture parts to the finished picture, and encoded information of one or more of the picture parts of the finished picture can be removed, thereby removing the picture part form the finished picture.

Another object of the invention is a data structure, embodied on a computer-readable medium, for use with a computer, the data structure storing information enabling the computer to produce a picture part based on one or more simple geometric figures. The data structure includes a logical picture part table having a layer for each geometric figure to be produced by the computer in composing the picture part. Each layer includes a parts code area for storing a numerical value representative of a simple geometric figure to be produced by the computer in composing the picture part, a color table number area for storing at least one color table reference value, an X coordinate area for storing a numerical value indicative of an X coordinate location at which the geometric figure is to be produced, a Y coordinate area for storing a numerical value indicative of a Y coordinate location at which the geometric figure is to be produced, an X size area for storing a numerical value indicative of a size in an X direction at which the geometric figure is to be produced, a Y size area for storing a numerical value indicative of a size in a Y direction at which the geometric figure is to be produced, a rotation area for storing a numerical value indicative of an amount at which the geometric figure is to be rotated, and a reversed area for storing a numerical value indicative of whether an orientation of the geometric figure is to be reversed in the picture part. The data structure also includes a logical color table having one or more rows, each row including a color code table number area for storing a color table reference number, an X position area for storing an X position, a Y position area for storing a Y position, and a color code area for storing a color code indicative of a color to be applied in the picture part.

Another object of the present invention is a data structure, embodied on a computer-readable medium, for use with a computer, the data structure storing information enabling the computer to produce a picture based on one or more picture parts. The data structure includes a logical picture table having a layer for each picture part composing the picture. Each layer includes a picture part code area for storing a numerical value representative of a picture part to be produced by the computer in composing the picture, an X coordinate area for storing a numerical value indicative of an X coordinate location at which the picture part is to be produced, a Y coordinate area for storing a numerical value indicative of a Y coordinate location at which the picture part is to be produced, an X size area for storing a numerical value indicative of a size in an X direction at which the picture part is to be produced, a Y size area for storing a numerical value indicative of a size in a Y direction at which the picture part is to be produced, a rotation area for storing a numerical value indicative of an amount at which the picture part is to be rotated, and a reversed area for storing a numerical value indicative of whether an orientation of the picture part is to be reversed in the picture.

In the description of the data structures above, the term "logical" means that the data is structured according to some logical format, such as a table. However, the data itself is not necessarily physically stored in such a manner on the computer readable medium, such as a hard drive, CD-ROM, or DVD, etc. Rather, the data is structured to have some logical interconnection with the other data stored according to the data structure.

BRIEF DESCRIPTION OF THE DRAWINGS

The object and features of this invention will become apparent from the following description taken in conjunction with the preferred embodiments thereof with reference to the accompanying drawings, in which:

FIG. 18b is a table of information coded according to the data structure of the present invention showing picture part codes and geometric figures of the picture shown in FIG. 18a;

FIG. 18c is a table of information coded according to the data structure of the present invention showing color codes of the picture parts shown in FIG. 18a;

FIG. 18e is a decoded color code table;

FIG. 19b is a table of information coded according to the data structure of the present invention showing picture part codes and geometric figures of the picture shown in FIG. 19a;

FIG. 19c is a table of information coded according to the data structure of the present invention showing color codes of the picture parts shown in FIG. 19a;

FIG. 19e is a decoded color code table;

FIG. 20b is a table of information coded according to the data structure of the present invention showing picture part codes and geometric figures of the picture shown in FIG. 20a;

FIG. 20c is a table of information coded according to the data structure of the present invention showing color codes of the picture parts of the picture shown in FIG. 20a;

FIG. 20e is a decoded color code table;

FIG. 21b is a table of information coded according to the data structure of the present invention showing picture part codes and geometric figures of the picture shown in FIG. 21a;

FIG. 21c is a table of information coded according to the data structure of the present invention showing color codes of the picture parts of the picture shown in FIG. 21a;

FIG. 21e is a decoded color code table;

FIG. 22b is a table of information coded according to the data structure of the present invention showing picture part codes and geometric figures of the picture shown in FIG. 22a;

FIG. 22c is a table of information coded according to the data structure of the present invention showing color codes of picture parts of the picture shown in FIG. 22a;

FIG. 22e is a decoded color code table;

FIG. 23b is a table of information coded according to the data structure of the present invention showing picture part codes and geometric figures of the picture shown in FIG. 23a;

FIG. 23c is a table of information coded according to the data structure of the present invention showing color codes of picture parts of the picture shown in FIG. 23a;

FIG. 23e is a decoded color code table;

FIG. 24b is a table of information coded according to the data structure of the present invention showing picture part codes and picture parts of the picture shown in FIG. 24a.

DETAILED DESCRIPTION OF A PREFERRED EMBODIMENT

Referring now to the accompanying drawings in which like numerals designate like parts throughout the several views thereof, there are shown in FIGS. 2–8, the methods and system components involved in drawing a picture such as a "ROCKET", a "CHAIR", a "HOUSE", "GRASS", a "FROG", a "GIRAFFE", a "HIPPOPOTAMUS", an "ALLIGATOR", and a "TOWN" in accordance with an embodiment of the present invention.

Figure 1:
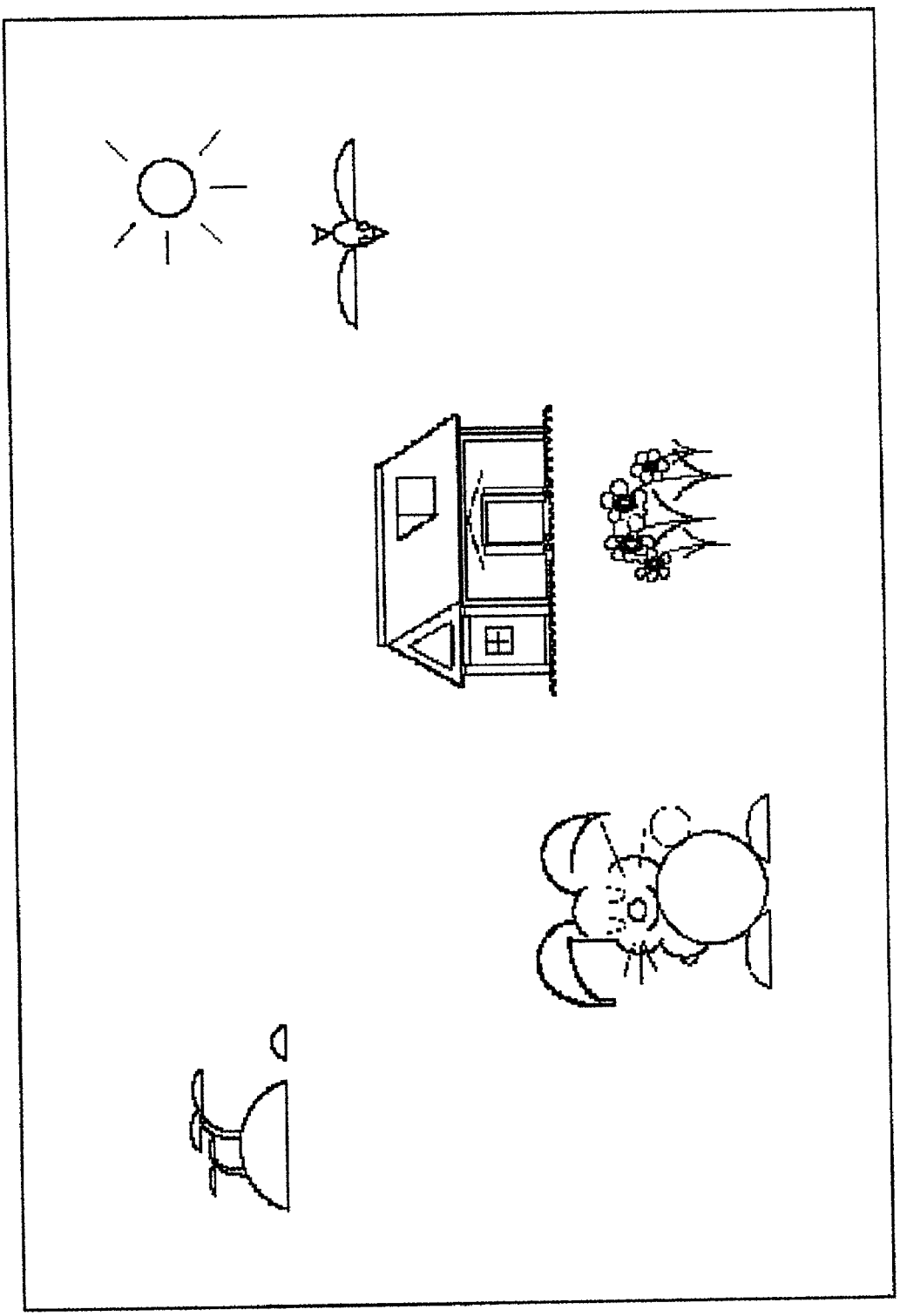
FIG. 1 is a front view of the finished picture drawn by the conventional method.
Figure 2:
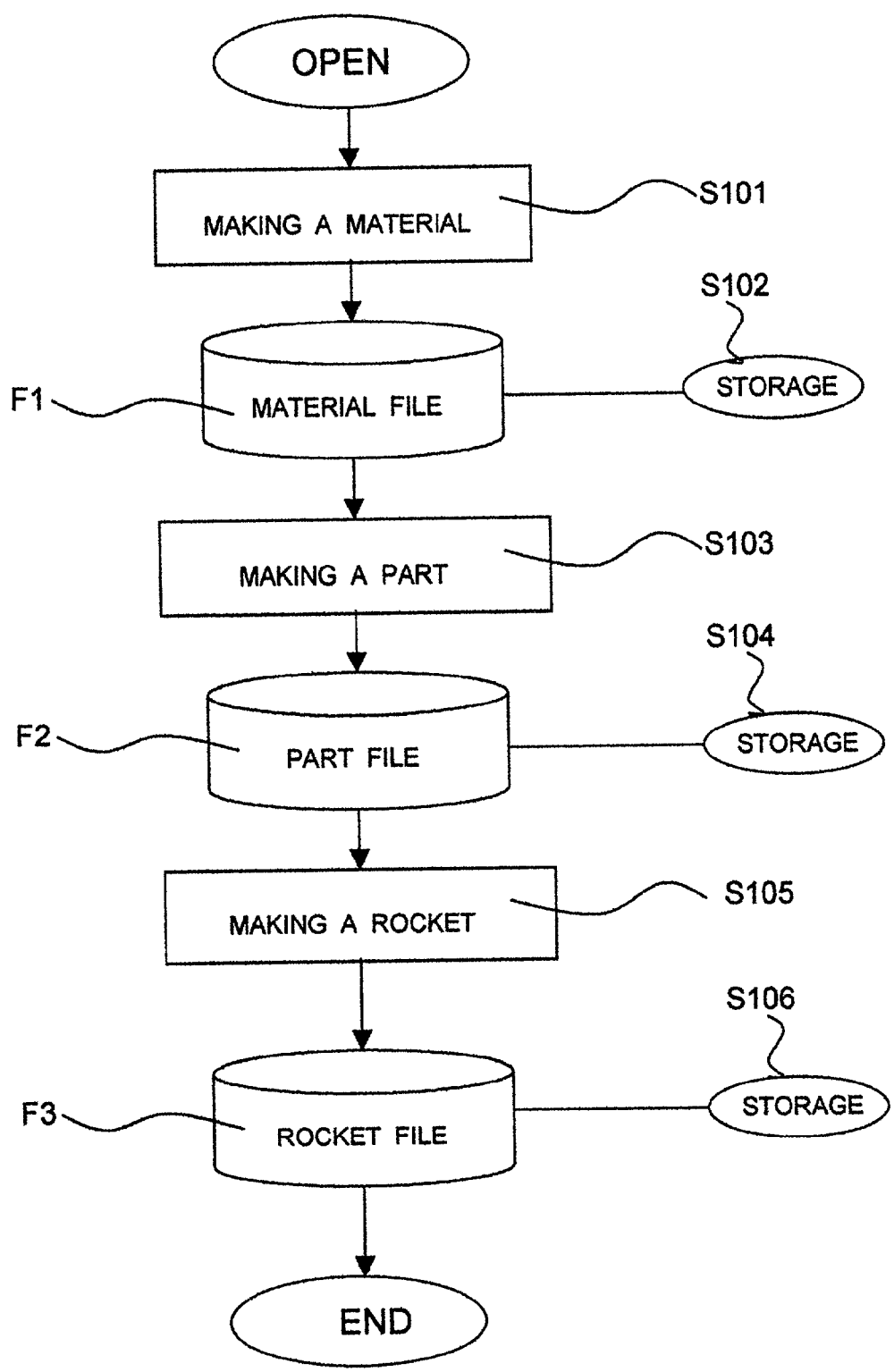
FIG. 2 is a flow chart illustrating the first manipulating order of drawing a picture, e.g., a rocket, on a display of a computer in accordance with the method of this invention.
Figure 3:
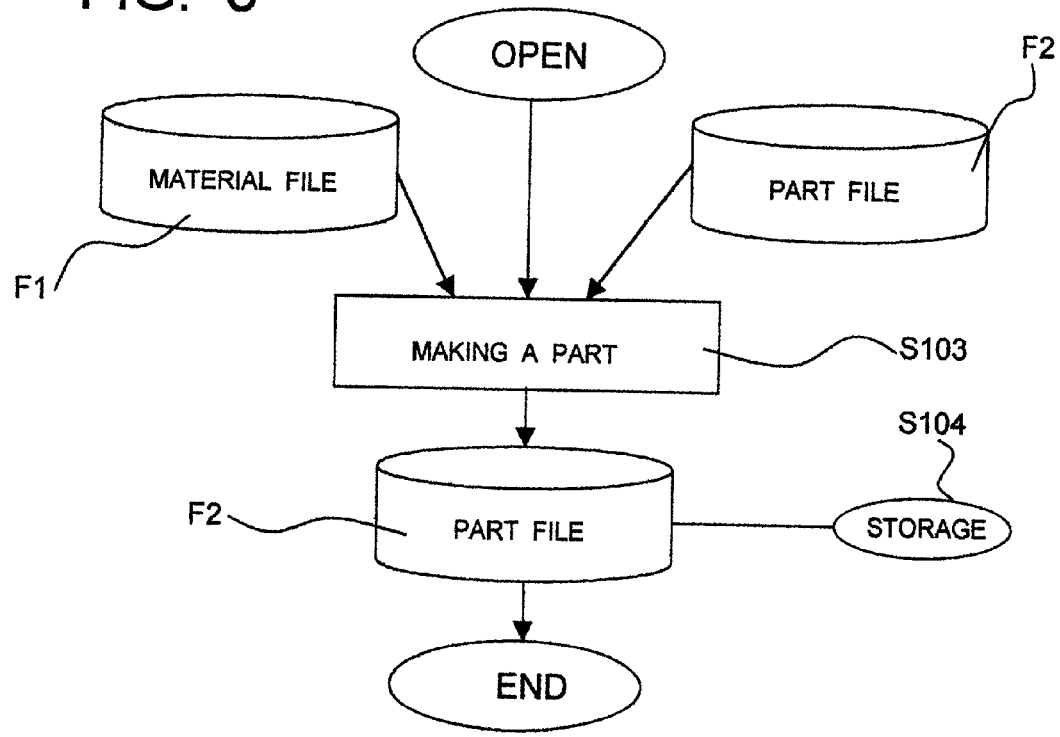
FIG. 3 is a flow chart illustrating the second manipulating order of drawing a picture, e.g., a rocket, in accordance with the method of this invention.
Figure 4:
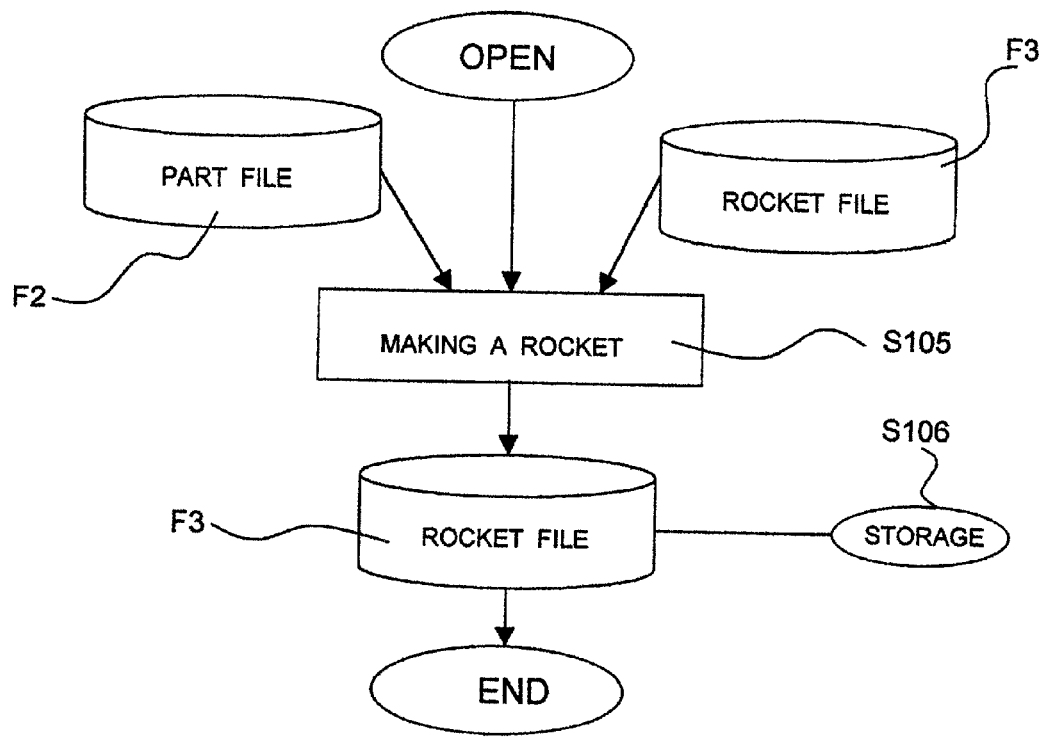
FIG. 4 is a flow chart illustrating the third manipulating order of drawing a picture, e.g., a rocket, in accordance with the method of this invention.
Figure 5:
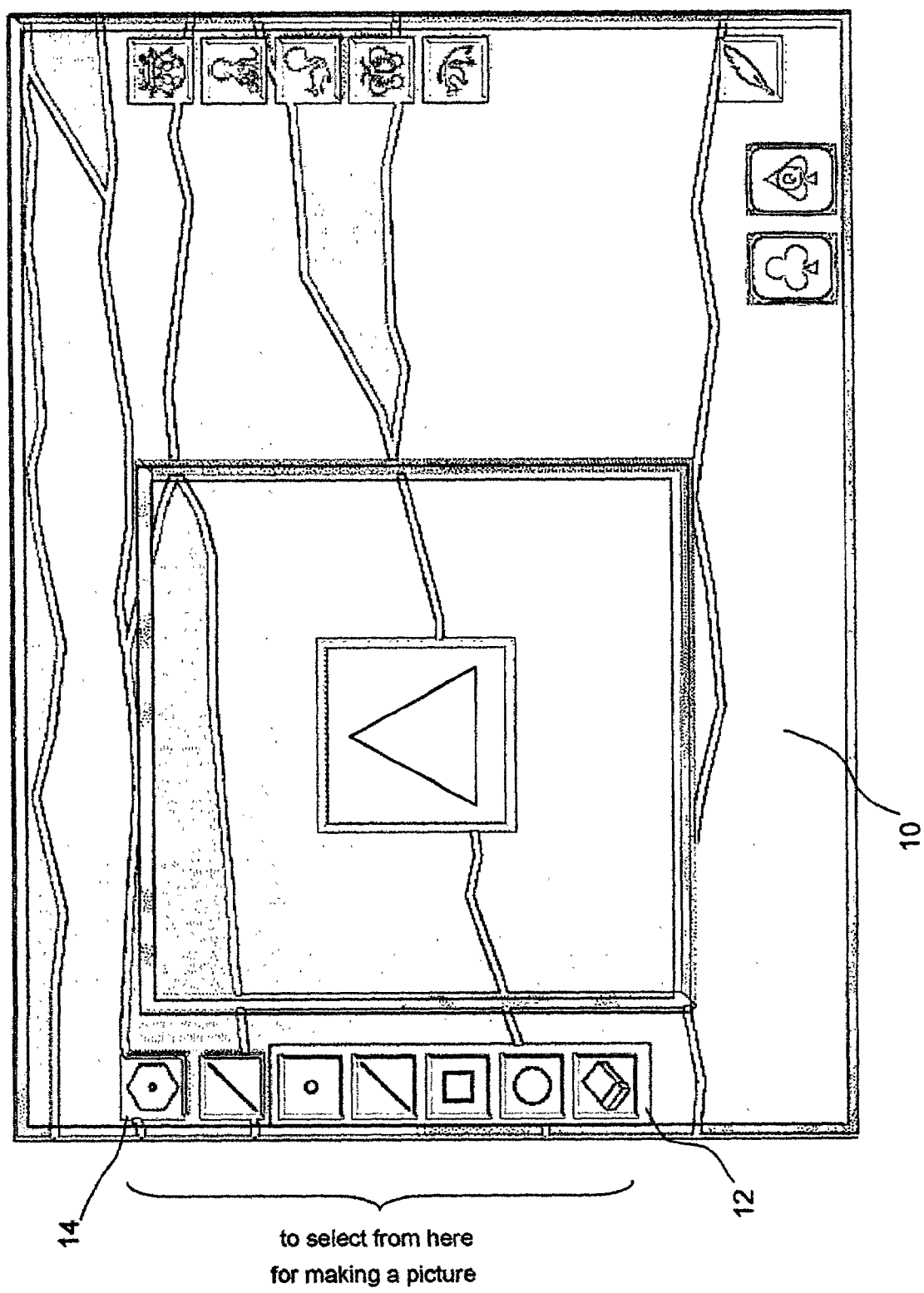
FIG. 5 is a front view of a file and folder appearing on a canvas when a method of drawing is being carried out.

An example of drawing a picture of a "ROCKET" R. (22) in accordance with an embodiment of the present invention is shown in FIGS. 2–8. As can be seen in FIGS. 7 and 8, materials 18, which are simple geometric figures, are made into picture parts 20 in order on a canvas 10 of a computer. As shown in FIGS. 3 and 4, the materials 18 and parts 20 are stored systematically, exchangeably and removably in the files $F_1$ and $F_2$, respectively. The materials and picture parts are stored in the form of information coded according to a data structure, which will be described in detail below. The data structure and the information coded according to the data structure are stored on a computer-readable medium, such as a hard drive, CD-ROM, DVD, so that the computer can access the coded information.

More particularly, when an icon 14 appearing on a left tool bar 12 on the canvas 10 is clicked (see FIG. 6), three boxes 16a, 16b and 16c are displayed as shown in FIG. 7. Inside the boxes 16a, 16b, and 16c are illustrations of basically simplified materials 18 (18a, 18b, 18c . . . ) which are simple geometric shapes previously stored in memory.

It can be well understood that the basically simplified materials 18 of every picture subject and item to be drawn are systematically simplified. Rather than storing the geometric figures as image files, the figures are stored as information according to the data structure of the present invention. However, for the purposes of displaying the simple geometric part icons in the boxes 16, image file can be used, but the image files are not used in the present drawing system, but only for the display icons.

In addition to the above mentioned basically simplified materials 18, the other necessary materials are made on the canvas 10 (S101), and they are stored systematically and exchangeably in a material file $F_1$ (S102) of a memory unit (not shown) as coded information.

The user points with a mouse cursor (not shown) on the basically simplified materials 18 in the MATERIAL FILE $F_1$, and drags and drops the selected basically simplified materials on the canvas 10 (S103). The system systematically, exchangeably and removably stores the materials in a memory unit of "A PART FILE $F_2$" (S104) as a table of coded numbers according to the data structure described later. Thus, the user selects materials 18 from the boxes 16a–16c to form a picture part 20, which is stored as coded numbers.

Then a finished picture, such as the "ROCKET R." 22 shown in FIG. 8, is drawn on the canvas 10 with the mouse cursor from the desired parts 20 from the "THE PART FILE $F_2$" (S105), and the finished picture, e.g., the "ROCKET R." 22, is stored in a "A FINISHED PICTURE FILE $F_3$" (S106), in this example named "ROCKET FILE" and shown in FIG. 4. The finished picture is also stored as coded information according to the data structure of the present invention.

In an example shown in FIGS. 3 and 7, other parts 20, 20—are made by dragging and dropping from the "MATERIAL FILE $F_1$" and the "PART FILE $F_2$" (S103), and the desired picture parts 20, 20—are stored systematically, exchangeably and removably in a memory unit of a "PART FILE $F_2$" (S104) as a table of coded numbers according to the data structure described later.

In an example shown in FIGS. 4 and 7, a picture of a "ROCKET R" 22 is made on the canvas 10 by dragging and dropping the desired picture parts 20, 20 with the mouse cursor (S105). The "ROCKET R" is stored systematically, exchangeably and removably, in a "FINISHED PICTURE FILE F3" (S106) as a table of coded numbers according to the data structure described later.

It is preferable that the picture parts 20 be as simple as possible so that they may be combined with any other parts or figures, enlarged, shortened or rotated, thus enabling the desired picture to be drawn on a canvas 10 in a manner similar to playing with building blocks on a canvas 10.

As described in the foregoing paragraphs, the picture to be illustrated may be drawn by combining the desired materials 18 such as lines, squares, triangles, and circles with the desired picture parts 20, 20—(S105).

As shown in FIG. 7, according to the method of drawing a picture of this invention, the parts are stored, presented, and operated on in such a way as if the parts were drawn in order on the transparent sheets 30, 30—on the computer. The transparent sheets are put upon one another.

The picture parts 20, 20—on a plurality of the transparent sheets 30, 30—can be seen from downward as shown in FIG. 7 so that the illustrated pictures look like a sheet of a single sheet.

In accordance with the method of this invention, the picture parts 20, 20—can be amended, colored, or deleted individually. This is done by the desired sheet 10 being brought up to a top position among the sheets, where amendment, coloring, or deletion of each picture part 20 can be easily carried out on a display or canvas 10 of the computer. Thus, the picture part 20 that is on the "top" sheet is the picture part on which the user can perform amendments.

It should be understood in this invention that the picture part 20 which is pointed with the mouse cursor (or encircled by a dotted line) is brought up at the top portion of the display 10 of the computer, and that clicking the icon of "ORDER" is to bring up one by one the transparent sheet 30 having the desired picture part 30 upwardly or downwardly at the top position of the display 10. Thus, the transparent sheets can be cycled through by the user until the desired picture part is on the top sheet or a particular sheet can be selected for movement to the top of the display.

In case of the transparent picture parts 20, 20—which are put upon another, they can be seen through downward, but when the upper picture parts are colored, the lower picture parts 20 cannot be seen. This effect can be seen, for example, in FIG. 23(a), which shows the various picture parts on the left of the display (in the layer position table) making up the finished picture on the right of the display. Depending on the order of the transparent sheets in the stack, certain portions of the lower picture parts are covered by the picture parts that are higher in the stack. Thus, in the picture shown in FIG. 23(a), some corners of the triangles are covered for example. This is because other picture parts, which are higher in position, are covering the corners of the triangles. However, any of the picture parts can be brought to the top of the display stack by selecting the desired picture part from the layer position table shown on the left side of FIG. 23(a), thereby allowing the desired picture part to be subject to amendment by the user, and thereby displaying the entirety of the desired picture part in the finished picture over any picture parts contained on lower levels.

When an icon "UP" at a left up corner on the display 10 is clicked with a mouse cursor in this embodiment, the transparent sheet 30 having a part FIG. 20 will come into view upwardly, and when it is intended to hide the picture part 20, an icon "DOWN" is clicked with the mouse cursor, thus lowering the picture part 20 causing at least portions of the lower picture part to disappear out of sight.

Subsequently, the icons "COLOR" and "ORDER" are clicked to select the desired color, and a mouse cursor is right-clicked at the desired point in order to color the desired portions.

Figure 6:
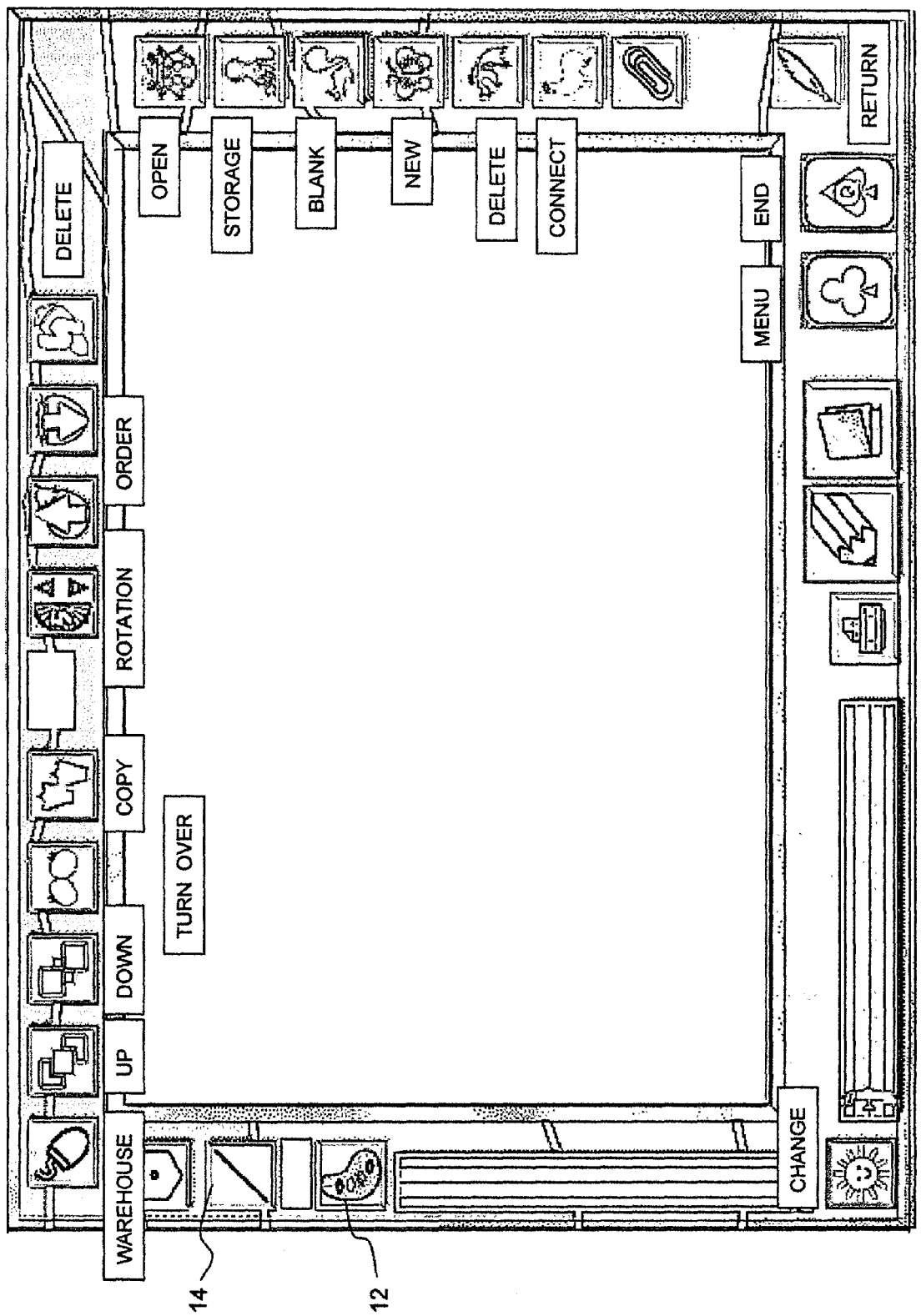
FIG. 6 is a front view of a material file of a canvas appearing on a display of a computer when the file shown in FIG. 5 is opened.
Figure 7:
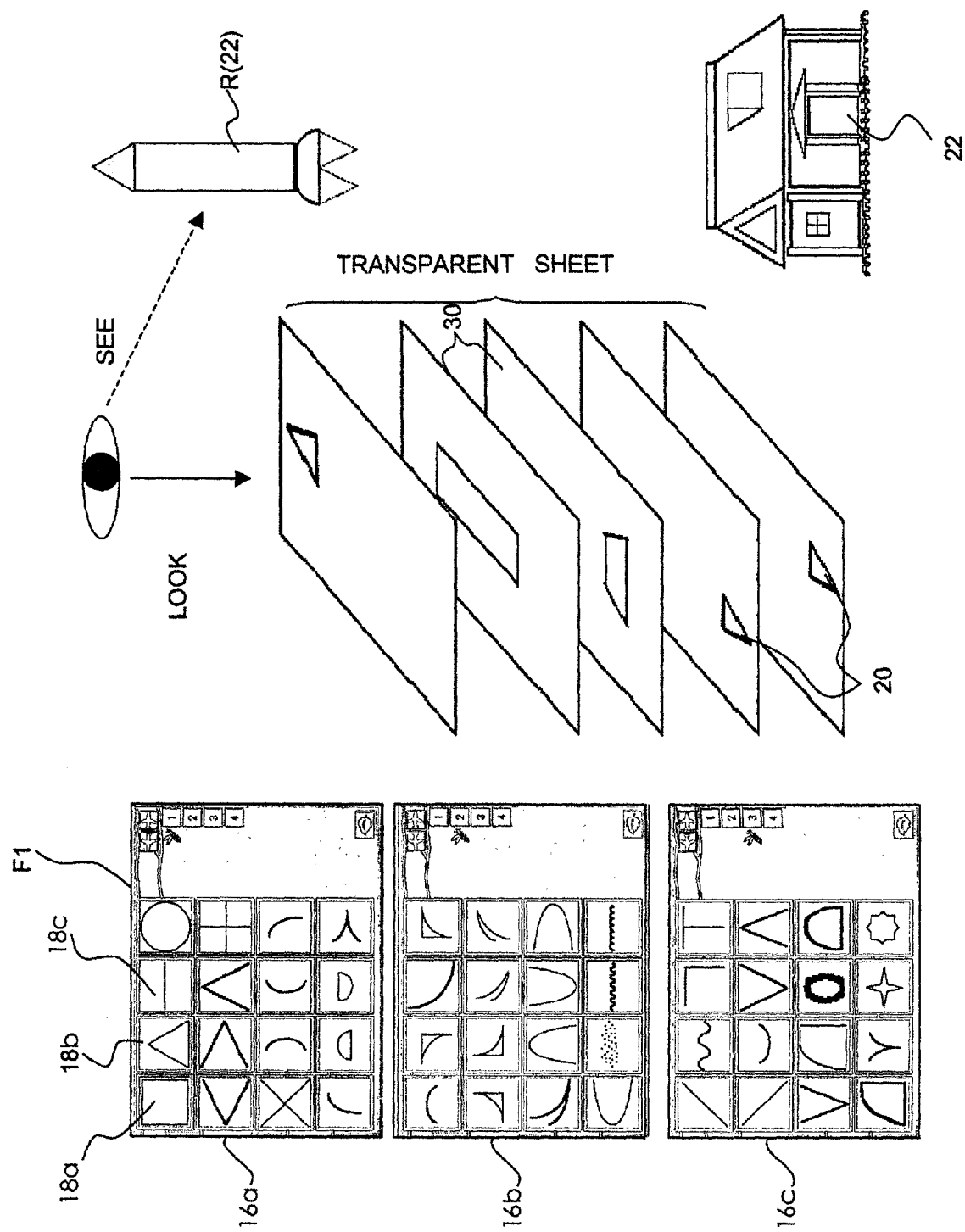
FIG. 7 is a front view of a material file and also a perspective view illustrating that a rocket and a simple house are drawn by dragging and dropping the desired materials (geometric figures) from the material file.
Figure 8:
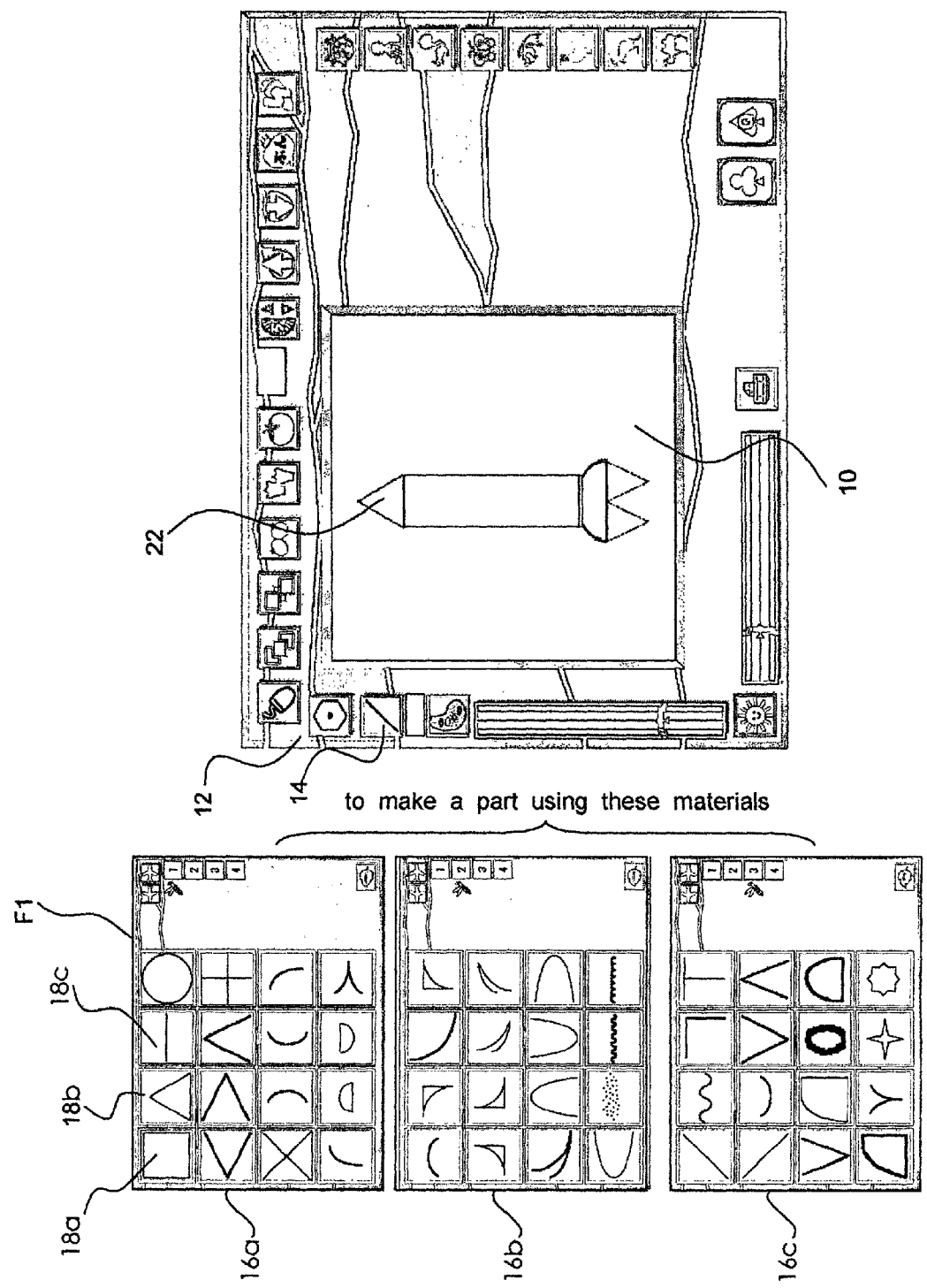
FIG. 8 illustrates the front views of a material file illustrating that the parts of a rocket are being made and the picture of the rocket is finished by dragging and dropping the desired materials (geometric figures) from the material file.

In an example of "MAKING A SIMPLE HOUSE" shown in FIGS. 6 and 7, an icon 14 is clicked to make various FIGS. 18 from the Material FILE $F_1$ as the desired picture parts 20, 20. The desired FIGS. 18 appearing on one or more of the boxes 16a–16c are selected in order with the mouse cursor, combined, enlarged, shortened or rotated, thus enabling to draw a "HOUSE" in a "FINISHED PICTURE FILE $F_3$" systematically and exchangeably (S105).

Figure 9:
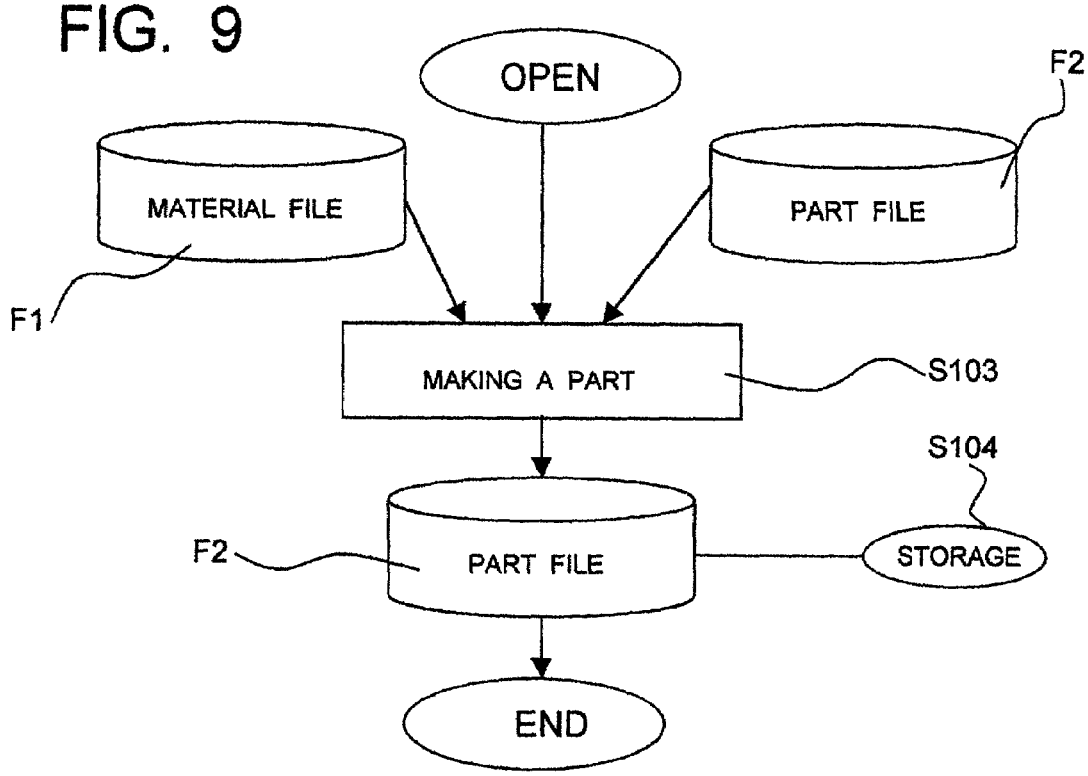
FIG. 9 is a flow chart illustrating the second manipulating order of drawing a picture, e.g., a simple house, in accordance with the method of this invention.
Figure 10:
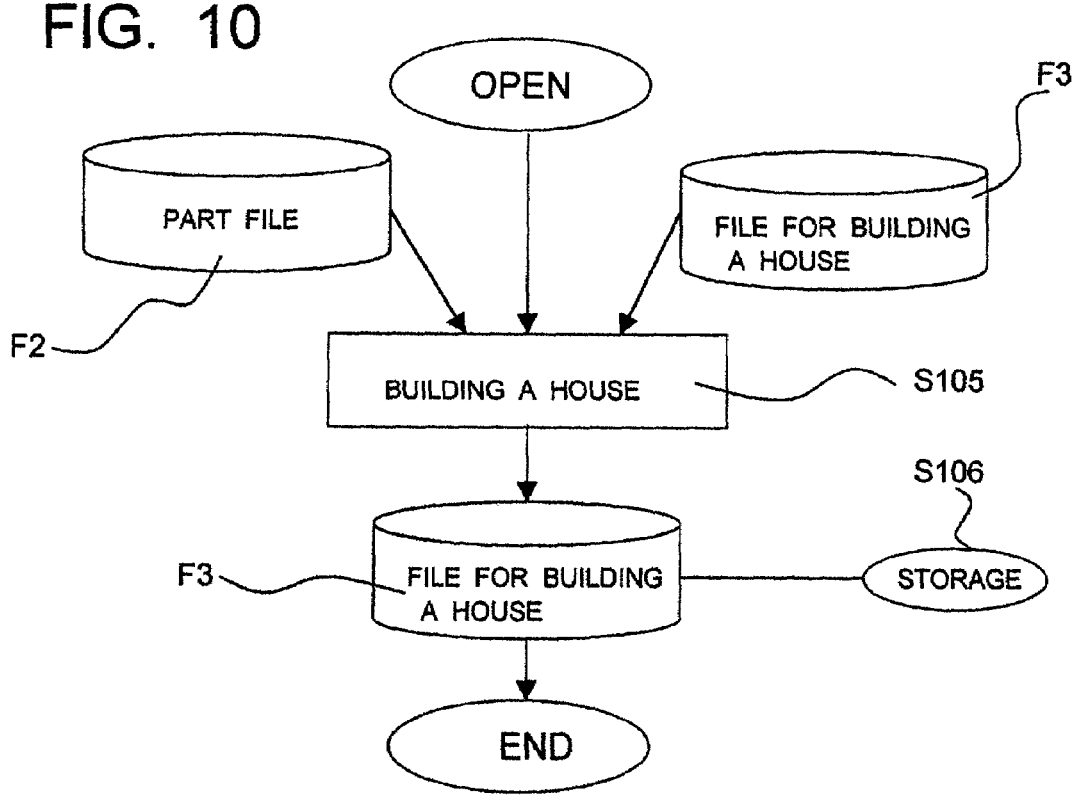
FIG. 10 is a flow chart illustrating the third manipulating order of drawing a picture, e.g., a simple house, in accordance with the method of this invention.

A manipulating order of drafting a "MAKING A SIMPLE HOUSE" is the same as that of the foregoing "MAKING A ROCKET", and as desired the former one can be drawn by the method shown in FIGS. 9 and 10.

Figure 11:
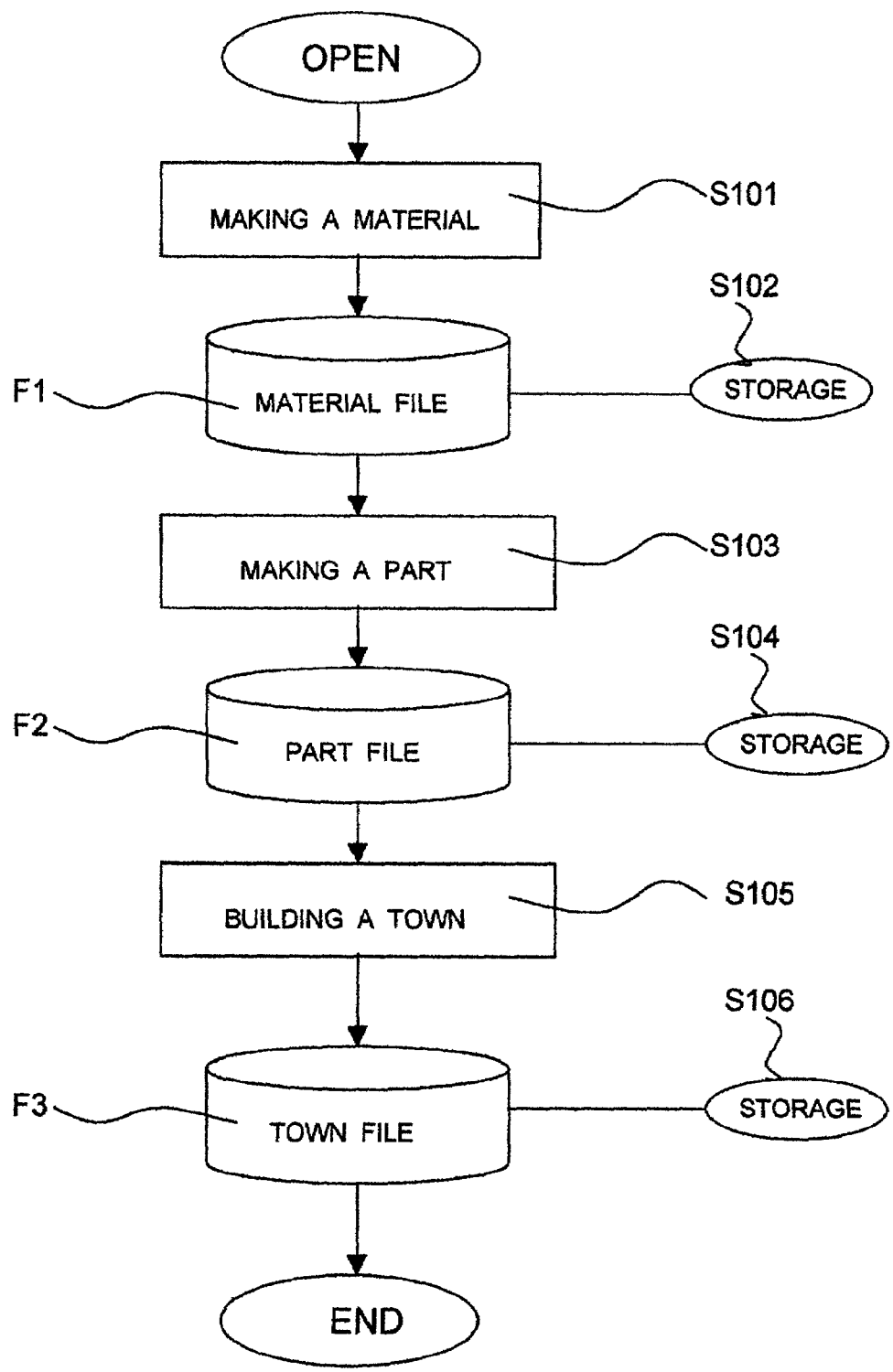
FIG. 11 is a flow chart illustrating the first manipulating order of building a larger picture, e.g., a town, in accordance with the method of this invention.
Figure 12:
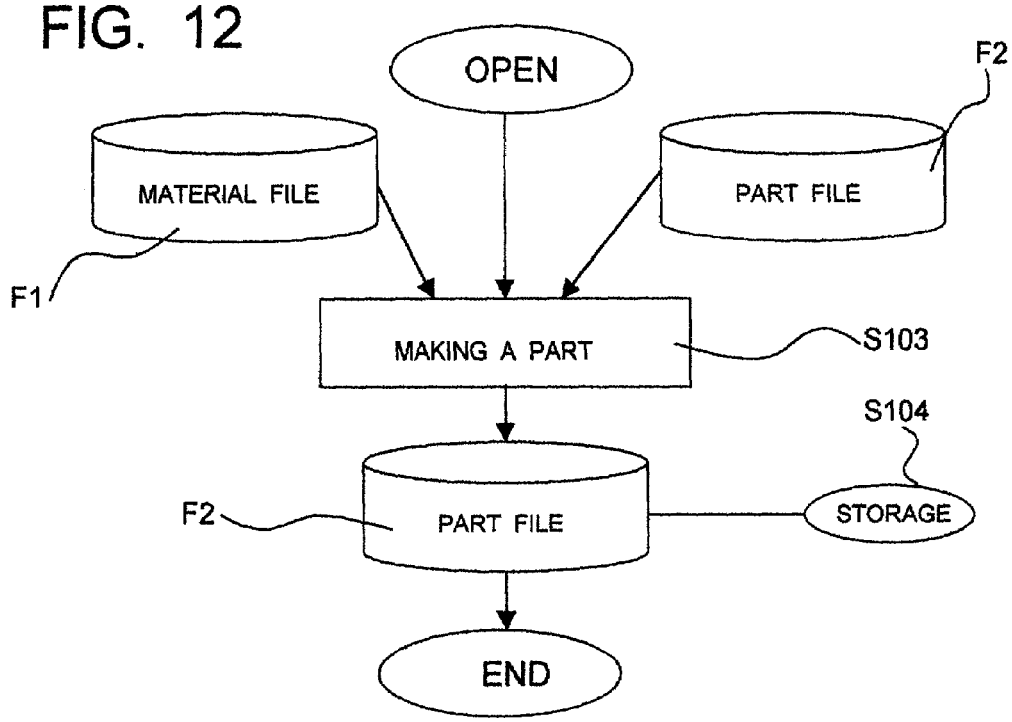
FIG. 12 is a flow chart illustrating the second manipulating order of building a larger picture, e.g., a town, in accordance with the method of this invention.
Figure 13:
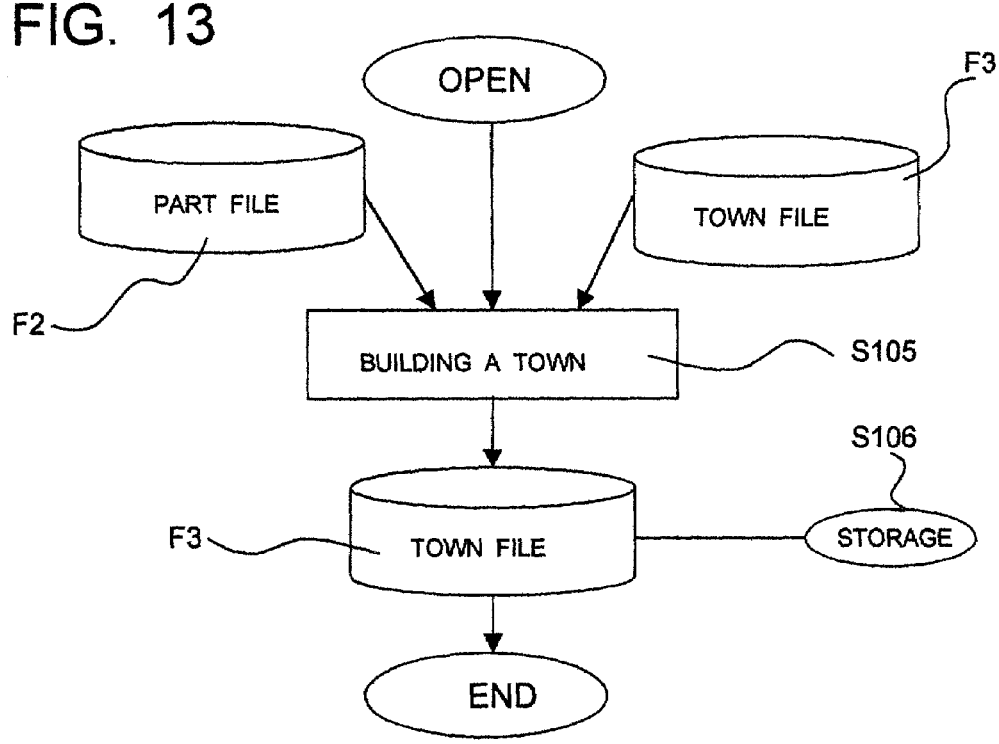
FIG. 13 is a flow chart illustrating the third manipulating order of building a larger picture, e.g., a town, in accordance with the method of this invention.
Figure 14:
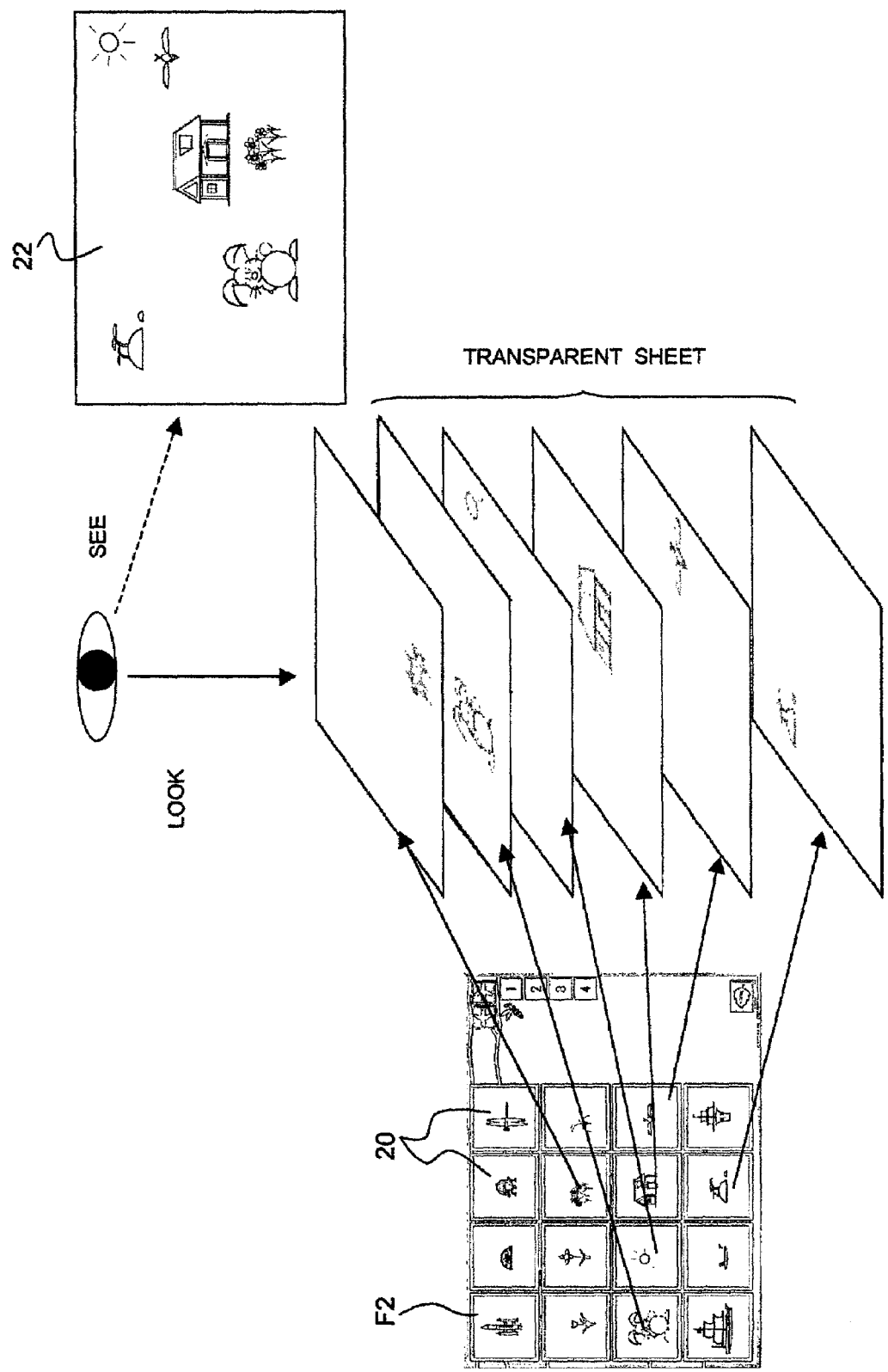
FIG. 14 is a flow chart illustrating transparently that the larger picture, e.g., the town, is being built on a transparent sheet by dragging and dropping the desired parts from the part files shown in FIGS. 11–13.

An example of "MAKING A TOWN" will be explained with reference to FIGS. 11–13.

"A MATERIAL FILE $F_1$", in which a number of the desired materials have been systematically and exchangeably stored (S102), is opened, and the desired materials 18a, 18b and 18c—are dragged and dropped with a mouse cursor from the "MATERIAL FILE $F_1$" to make the desired picture parts 20, 20—(S103), which are systematically and exchangeably stored in the "PART FILE $F_2$" as a table of coded numbers according to a data structure described later.

In another example shown in FIGS. 11–13, the desired part FIGS. 20, 20—are dragged and dropped with a mouse cursor from the "PART FILE $F_2$" to make the desired "TOWN" 22 (S105), which is systematically and exchangeably stored in the "TOWN FILE $F_3$" (S106) as a table of coded numbers according to a data structure described later.

In still another example shown in FIG. 12, the desired FIGS. 18, 18, . . . from the "MATERIAL FILE $F_1$" as well as desired parts 20, 20, . . . from the "PART FILE $F_2$" are dragged and dropped with a mouse cursor to make the desired part FIGS. 20, 20—(S103), which are systematically and exchangeably stored in the "PART FILE $F_2$" (S103) as coded information according to a data structure described later. Thus, the basic geometric figures in the material file can be used to form picture parts, but the picture parts can also be used to form new picture parts. A picture part can be a combination of geometric figures from the material file and parts from the parts file.

In another example shown in FIG. 13, another desired "TOWN" 22 is being drawn from the "PART FILE $F_2$" and the "TOWN FILE $F_3$" which is systematically and exchangeably stored back in the "TOWN FILE $F_3$" (S106) as information coded according to a data structure described later. Thus, the picture parts in the parts file can be used to form finished pictures, but the finished pictures can also be used to form new finished pictures. A finished picture can be a combination of parts from the parts file and finished pictures from a finished picture file. As shown in FIG. 13, a first town from the town file F3 can be combined with one or more picture parts from the part file F2 to form a new town, which is stored in the same, or a new, town file (finished picture file F3).

As a further simple example, the material file may contain a triangle and a square. The triangle and square can be dragged and dropped from the material file, which is illustrated in a window on the computer display, and manipulated in terms of size and rotation, etc. to form a first house. The triangle and square may have their color selected as red. The red house is thus saved as a picture part in a part file, i.e., "RED HOUSE." The red house can be dragged and dropped from the "RED HOUSE" part file, the colors of the triangle and/or square changed, to e.g., white, and the sizes and/or rotations altered, and another triangle added and colored green to represent a tree. This picture can be saved as a picture part in a part file called "White House with Tree." The square may be dragged and dropped twice from the material file and arranged one above the other to form a rectangle, which represents a simple office building. The colors of the squares may be selected as brown. This brown office building is saved as a picture part in a part file, i.e., "Brown Office Building."

The red house can be dragged and dropped from the "RED HOUSE" part file and saved as a finished picture by itself. Alternatively, the red house can be dragged and dropped from the "RED HOUSE" part file, the brown office building can also be dragged and dropped from the "Brown Office Building" part file, next to the red house, and this picture can be saved as a finished picture called "Town A." In another alternative, the red house can be dragged and dropped from the "Red House" part file, the brown building can be dragged and dropped from the "Brown Office Building" part file, and the white house and tree can be dragged and dropped from the "White House and Tree" part file. The resulting picture can be saved as "TOWN B" finished picture file. Finally, either of the "TOWN A" or "TOWN B" files can be selected, any of the picture parts of the picture altered or deleted and any new picture parts added and the file saved as a "TOWN C" finished picture file.

Figure 15:
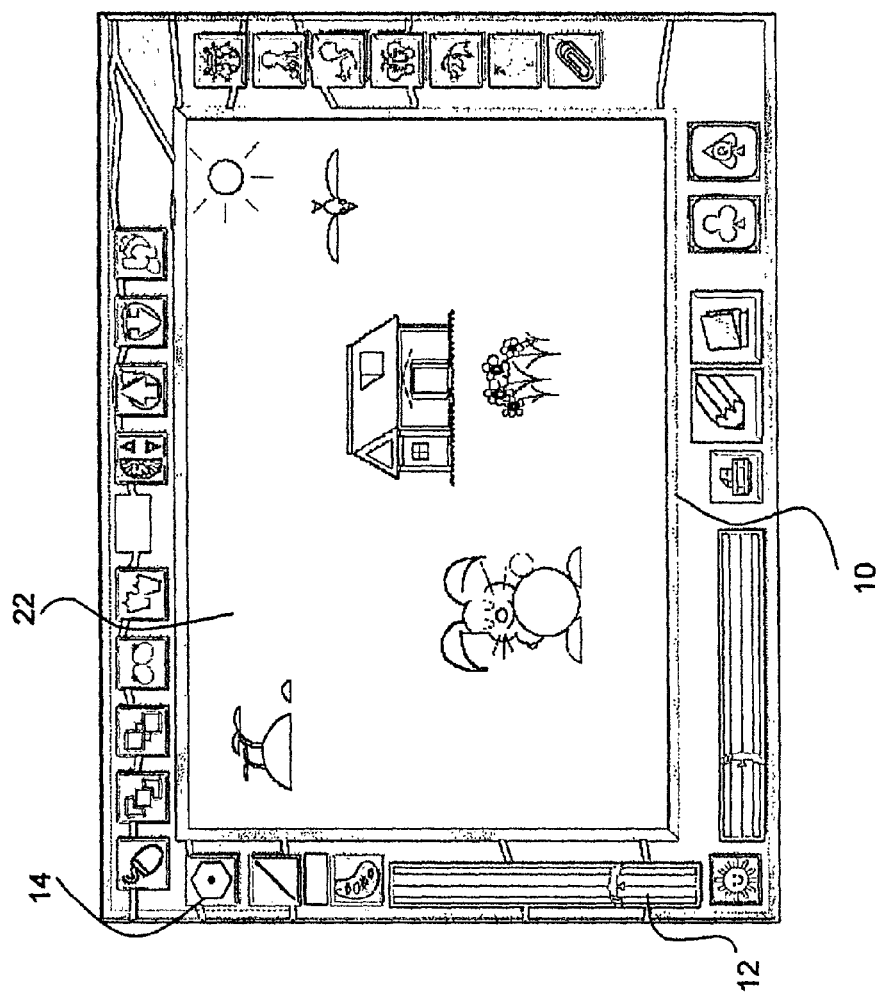
FIG. 15 is a schematic illustration of the finished larger picture, e.g., the town, which is built by the desired parts, which are being dragged and dropped from a part file and its desired part file.
Figure 15:
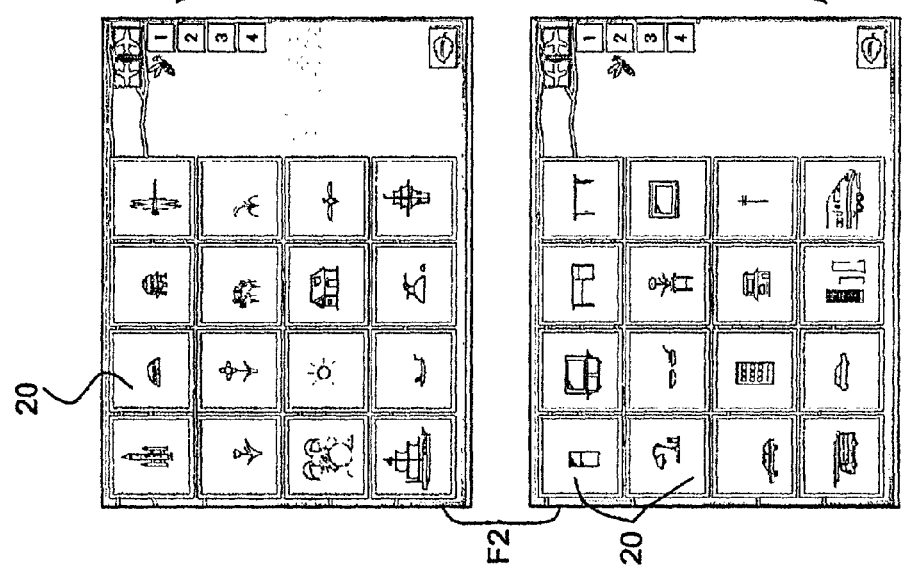

The file names given above, i.e., "RED HOUSE," "White House with Tree," "Brown Office Building," "Town A," and "Town B" are not necessary. Rather, the actual pictures represented in the respective files can be illustrated in the window on the computer without the file name as shown in FIG. 15, which shows some of the available parts 20 that were used in making the finished picture 22. Thus, the user's interface to the geometric figures, the picture parts, and the finished pictures is preferably the representation of the picture in the respective file, and not file names.

Figure 16:
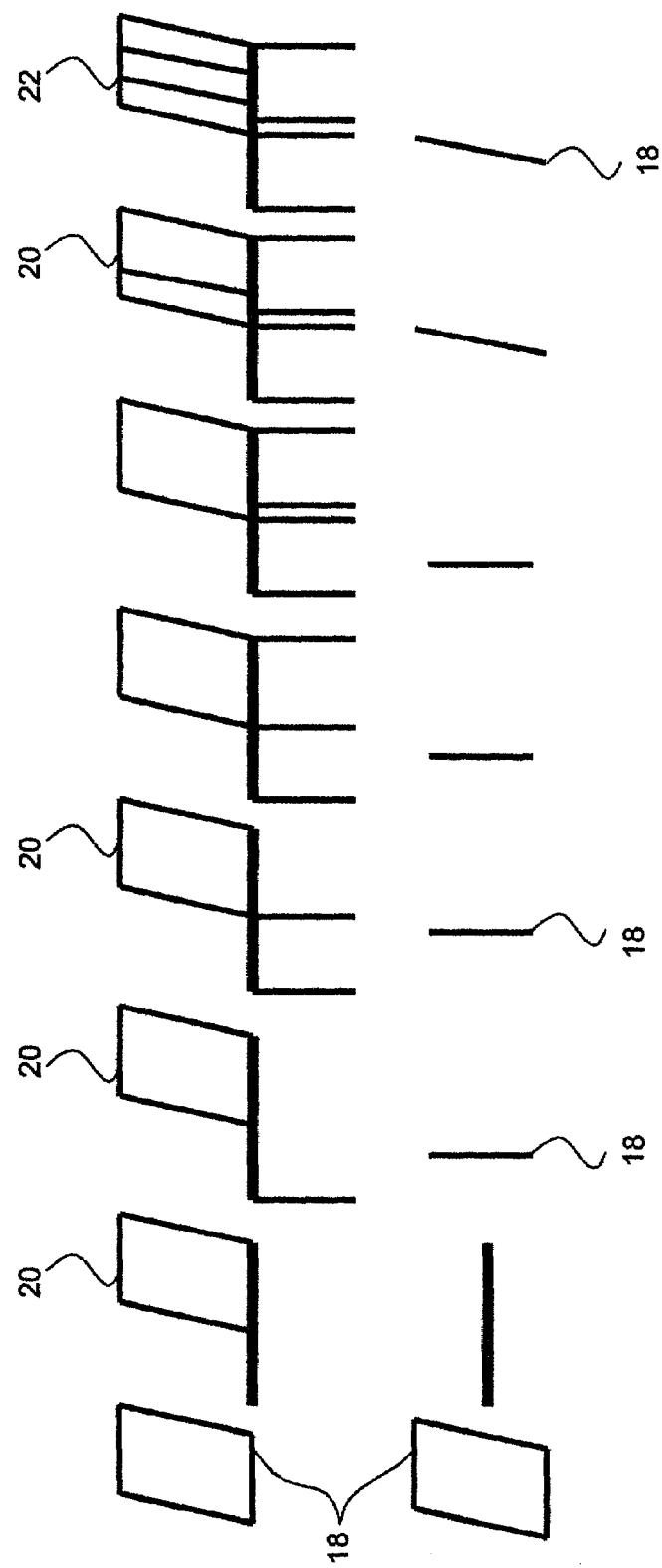
FIG. 16 is an illustration of an order of making a picture, e.g., a chair, using materials and parts.
Figure 17:
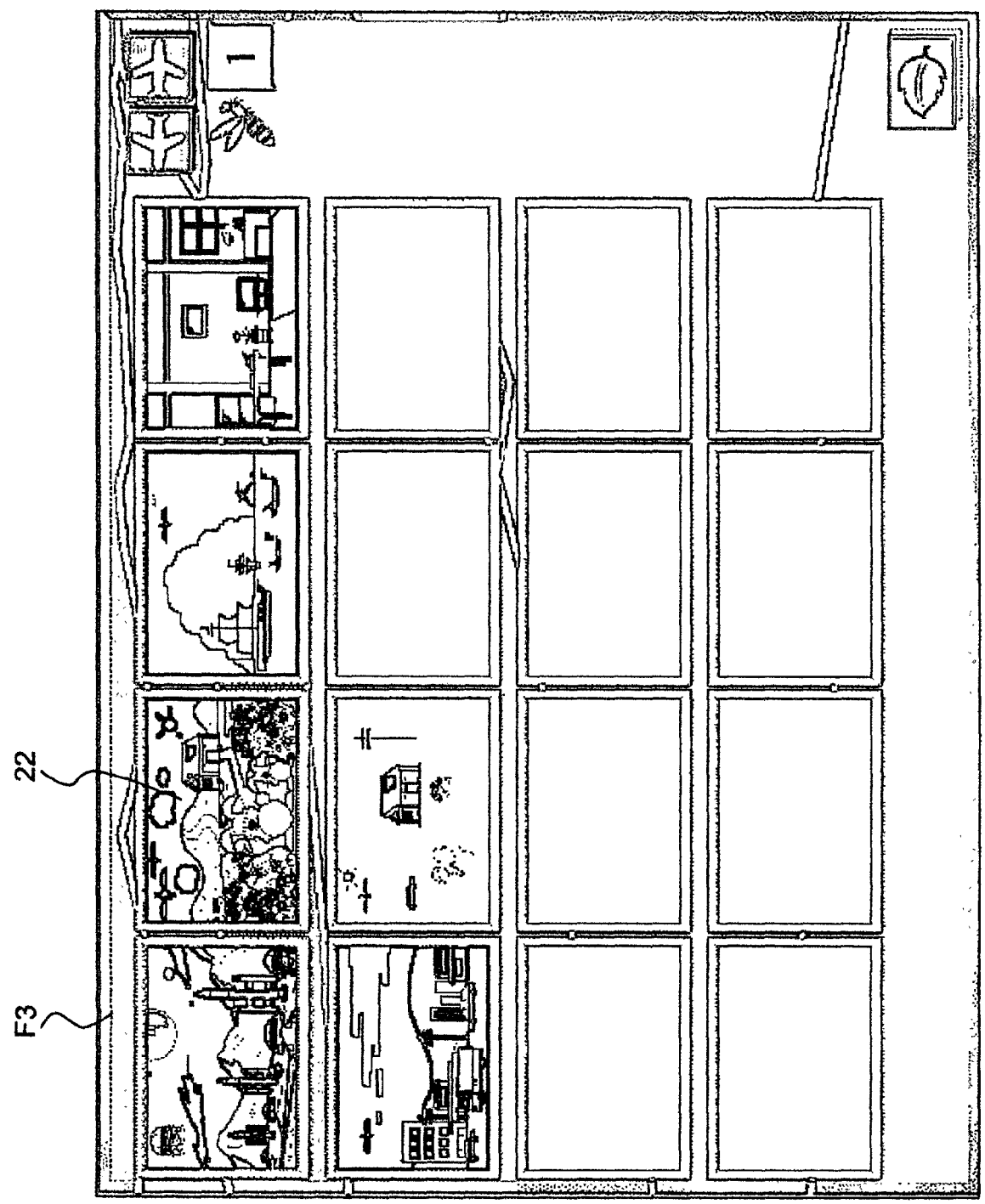
FIG. 17 is a computer display of a number of finished pictures.

FIG. 16 is a front view illustrating an order of making a chair, wherein the desired materials 18 are dragged and dropped with a mouse cursor from the "MATERIAL FILE $F_1$" to make the desired picture parts 20, 20 . . . (S103), which are made into a finished picture of a "CHAIR" 22 (S105), and subsequently it is stored systematically and exchangeably (S106) as numbers coded according to a data structure described later.

In accordance with the method of drafting a picture according to the present invention, the basically simplified materials 18 are dragged and dropped in order with a mouse cursor from the "MATERIAL FILE $F_1$" to make the desired picture parts 20, 20 . . . (S103), which are capable of being added to or amended, and stored systematically and exchangeably in a memory unit (S104) as a table of coded numbers according to a data structure described later.

Subsequently, the desired picture parts 20, 20, . . . are dragged and dropped in order with a mouse cursor from the "PART FILE $F_2$" (S104) to make the desired finished picture 22 (S104), which is stored systematically and exchangeably in a memory unit of a "FINISHED FILE $F_3$" (S105) as a table of coded numbers according to a data structure described later.

A system for drafting a picture according to the present invention comprises a "MATERIAL FILE $F_1$" including a number of the basically simplified materials 18 stored systematically and exchangeably in a memory unit, a "PART FILE $F_2$" including a number of the desired picture parts 20, 20, . . . dragged and dropped in order with a mouse cursor from the "MATERIAL FILE $F_1$", which are capable of being added to or amended, and stored systematically and exchangeably in a memory unit, and a "FINISHED PICTURE FILE $F_3$" including one or more picture parts 20 which are dragged and dropped in order from the memory unit of the "PART FILE $F_2$" and stored systematically and exchangeably.

A system for drafting a picture according to the present invention comprises a "MATERIAL FILE $F_1$" including a number of the basically simplified materials 18 stored systematically and exchangeably in a memory unit, a "PART FILE $F_2$" including a number of the desired materials 18 dragged and dropped in order with a mouse cursor from the "MATERIAL FILE $F_1$" to form one or more picture parts 20, which are capable of being added to or amended, and stored systematically and exchangeably in a memory unit, and a "FINISHED PICTURE FILE $F_3$" including a number of picture parts 20 which are dragged and dropped in order from the memory unit of the "PART FILE $F_2$" and stored systematically and exchangeably as a finished picture.

As described in the foregoing paragraphs, in accordance with this invention, a given creature or other picture subject is divided into the basically simplified materials which are systematically, exchangeably and removably stored in the memory unit of the "MATERIAL FILE $F_1$" from which the desired materials are dragged and dropped on the display 10 of the computer to make the desired parts which can be stored in the "PART FILE $F_2$", from which the desired picture can be worked up or drafted and stored in the "FINISHED PICTURE FILE $F_3$", thus enabling the unskilled user to get skilled in handling the computer.

Meanwhile, it should be understood that the desired materials, parts, and pictures are not stuck in the "MATERIAL FILE $F_1$", the "PART FILE $F_2$" and the "PART FILE $F_2$" respectively, but they are stored in the given files systematically, exchangeably and removably as a table of coded numbers according to a data structure described later.

Figure 18A:
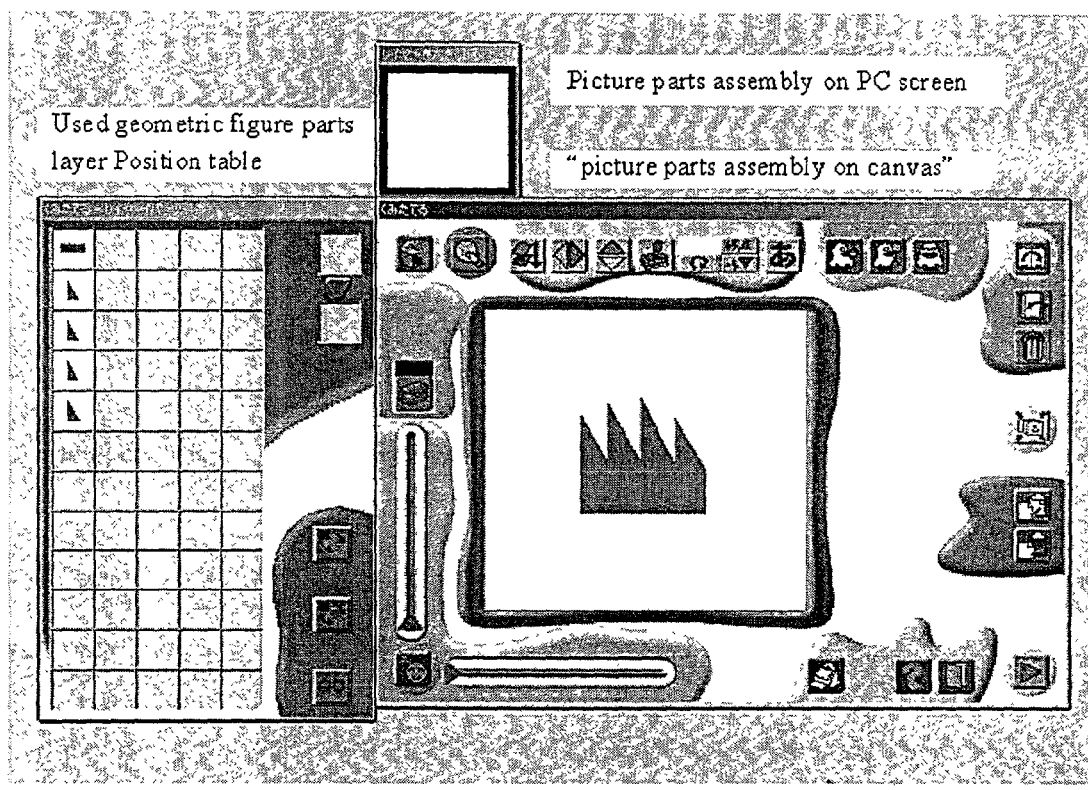
FIG. 18a is a computer display during drawing of a "picture part" on the computer, geometric figures and a layer position table for drawing "grass"
Figure 18D:
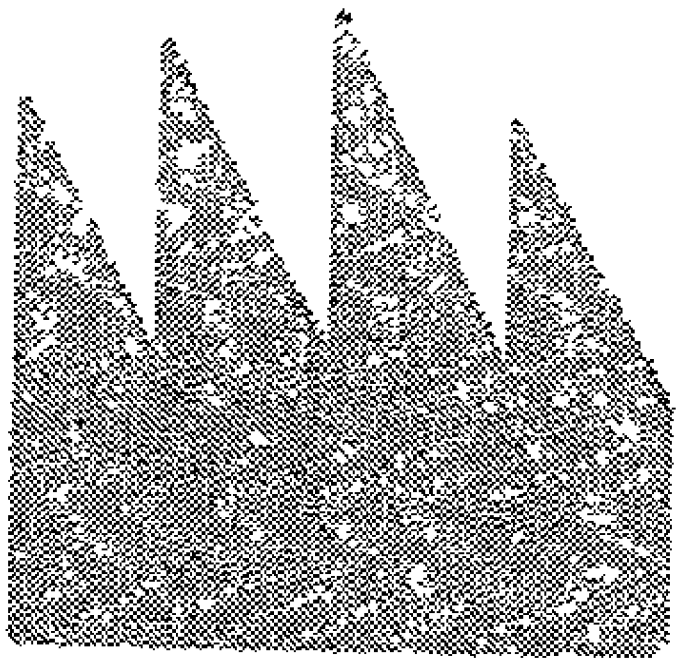
FIG. 18d is a an illustration of the "grass" drawn by the geometric figures shown in FIGS. 18a–18c.

Referring to FIGS. 18a–18e, a picture of "GRASS" is drawn from a "picture parts" assembly and "used geometric figure parts" on the canvas 10. The used geometric parts layer position table section, on the left side of FIG. 18a, shows the picture parts 20 that make up the finished picture of the grass, shown in the window on the right side of FIG. 18a. The used geometric parts window also shows the order in the stack of transparent sheets each picture part occupies. FIGS. 18b and 18c show the encoded information of the finished picture of grass. The encoded information, as can be seen in FIGS. 18b and 18c, is a table of coded numbers arranged according to a data structure that will be described in greater detail with reference to FIGS. 19a–e below. In summary, the data structure includes coded data for the picture part in each transparent sheet or layer, including a coded number indicating the layer number, part code number, x and y coordinates, size in terms of x and y distance, rotation value, a reversed code, and color code. FIG. 18d shows the finished picture of grass. FIG. 18e shows the colors that correspond to the color codes.

Figure 19A:
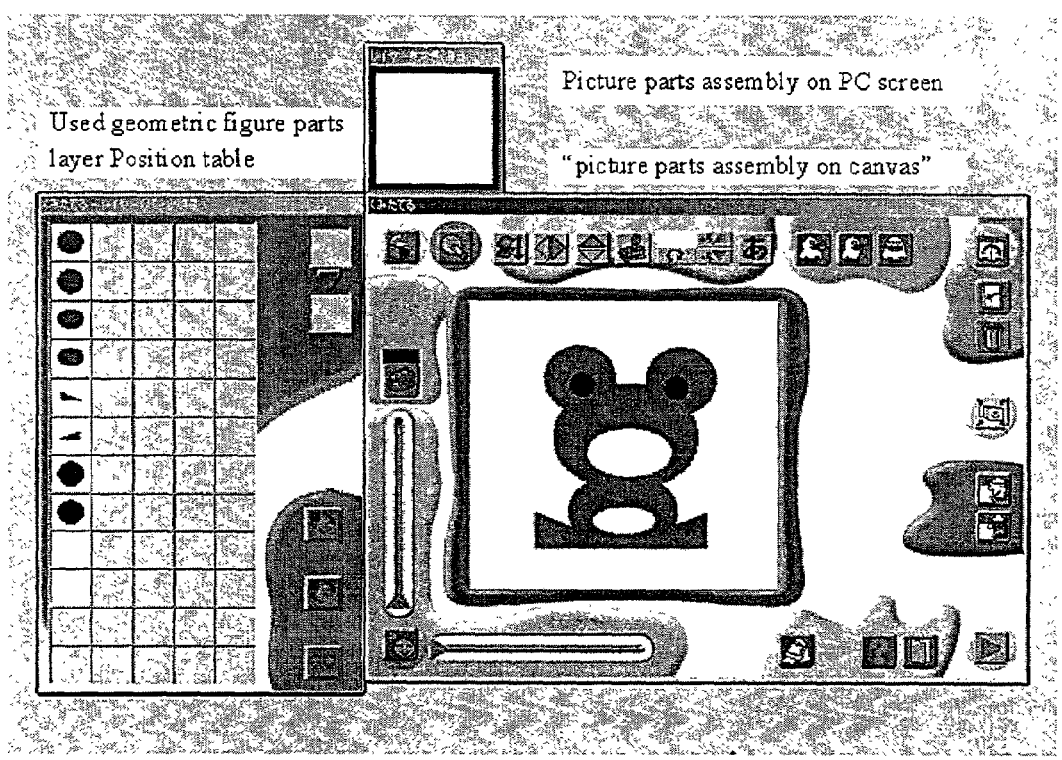
FIG. 19a is a computer display during the drawing of a "picture part" on the computer, geometric figures, and a layer position table for drawing a "frog"

In FIGS. 19a–19e, a "frog" is drawn from a "picture parts" assembly and "used geometric figure parts" on the canvas 10. The window on the left side of the display shown in FIG. 19a illustrates the parts used in the finished picture of the frog. The encoded information for these parts, in the form of a table of encoded numbers according to the data structure of the present invention, is shown in FIG. 19b. The data is structured as follows:

The layer numbers 0–9 in FIG. 19b correspond to the list of parts shown in the window on the left side of the display of FIG. 19a.

Layers 0 and 1 are the picture parts 20 of the outer part of the eyes of the frog. The encoded information for layer 0, which is the outer part of the left eye, includes parts code #4, for circle or ellipse, the associated color table number, the X/Y coordinates 56, 29, X/Y size 102, 102 (the same because the outer part of the left eye is a circle and thus has the same X and Y size), rotation of 0 degrees, and a reverse code of 0. Also shown in FIG. 19b is the basic geometric figure, i.e., a circle, from which the picture part of layer 0 is formed.

The encoded information for layer 1, which is the outer part of the right eye, includes parts code #4, for circle or ellipse, the associated color code, the X/Y coordinates 155, 31, X/Y size 102, 102 (the same because the outer part of the right eye is a circle and thus has the same X and Y size), rotation of 0, and a reverse code of 0. The picture parts 20 are thus made of basic materials, which are simple geometric shapes, altered in accordance with the coded numbers, i.e., position, size, rotation, and either reversed or not reversed, and color in the encoded information table.

The possible reverse codes are 0 for none, 1 for horizontally reversed, 2 for vertically reversed, and 3 for both horizontally and vertically reversed.

Layer 2 is the picture part of the head of the frog. The encoded information for layer 3 includes parts code #4, for circle or ellipse, the associated color code, the X/Y coordinates 47,58, X/Y size 210, 166 (not the same value because the head is an ellipse not a circle and thus has a major axis in the X direction and a minor axis in the Y direction), rotation of 0, and a reverse code of 0.

Layer 3 is the picture part of the body of the frog. The encoded information for layer 4 includes parts code #4, for circle or ellipse, the associated color code, the X/Y coordinates 69,160, X/Y size 160,118 (not the same value because the body is an ellipse not a circle and thus has a major axis in the X direction and a minor axis in the Y direction, also note that the body of the frog is smaller than the head which is apparent both from the picture of the frog and the encoded size information of the respective ellipses of the head and body), rotation of 0, and a reverse code of 0.

Layer 4 is the picture part of the left foot of the frog. The encoded information for layer 5 includes parts code #61, for triangle, the associated color code, the X/Y coordinates 20,203, X/Y size 168,72, rotation of 0, and a reverse code of 0. The simple geometric figure, i.e., triangle, from which the left foot picture part is made is also shown.

Layer 5 is the picture part of the right foot of the frog. The encoded information for layer 5 includes parts code #61, for triangle, the associated color code, the X/Y coordinates 107,203, X/Y size 168,72, rotation of 0, and a reverse code of 1. Since the reverse code is 1 here, the triangle of parts code 61 is horizontally reversed. The difference between the triangle 61 for the left foot and the horizontally reversed triangle 61 of the right foot can be seen in the picture of the frog in FIG. 19(*d*).

Layers 6 and 7 are the picture parts of the inner part of the eyes of the frog. The encoded information for layer 6, which is the inner part of the left eye, includes parts code #4, for circle or ellipse, the associated color code, the X/Y coordinates 92,69, X/Y size 34,34 (the same because the inner part of the left eye is a circle and thus has the same X and Y size), rotation of 0, and a reverse code of 0. The encoded information for layer 7, which is the inner part of the right eye, includes parts code #4, for circle or ellipse, the associated color code, the X/Y coordinates 184,73, X/Y size 34,34 (the same value because the inner part of the right eye is a circle and thus has the same X and Y size), rotation of 0, and a reverse code of 0.

Layer 8 is the picture part of the mouth of the frog. The encoded information for layer 8 includes parts code #4, for circle or ellipse, the associated color code, the X/Y coordinates 95,121, X/Y size 120,72 (not the same value because the mouth is an ellipse not a circle and thus has a major axis in the X direction and a minor axis in the Y direction), rotation of 0, and a reverse code of 0.

Layer 9 is the picture part for the belly of the frog. The encoded information for layer 9 includes parts code #4, for circle or ellipse, the associated color code, the X/Y coordinates 106,208, X/Y size 88,40 (not the same because the belly is an ellipse and thus has a major axis in the X direction and a minor axis in the Y direction, also note that the belly of the frog is smaller than the mouth which is apparent both from the picture of the frog and the encoded size information of the respective ellipses of the mouth and belly), rotation of 0, and a reverse code of 0.

FIG. 19*c* is a color table associated with the table of FIG. 19*b*. As discussed above, in each layer of FIG. 19*b*, there is a color table no. This is a reference to the color table shown in FIG. 19*c*. Specifically, the color table no. entry in each layer of FIG. 19*b* is a pointer to the corresponding color table no. row in FIG. 19*c*. The numbers separated by a colon ":" represent the chronological coloring operations associated with the part in the respective layer in FIG. 19*b*. Thus, for layer 0 of FIG. 19*b*, first color table no. 0 was selected, which points to color table no. 0, i.e., row 0, in the color table shown in FIG. 19*c*. The color code "0" in the right-most column in row "0" of FIG. 19*c* is a reference to the decoded color table shown in FIG. 19*e*. Thus, the color code "0" represents the color black as can be seen in FIG. 19*e*. Therefore, according to color table no. 0, i.e., the first row of FIG. 19*c*, the color black is applied based on the information in the color table of FIG. 19*c* and the information in FIG. 19*b*. Second, the color table no. "01" is shown after the colon ":" in the color table no. entry column of layer 0 in FIG. 19*b*. In the same manner as just described, this number "1" is a reference to row 1 of the color table of FIG. 19*c*, which includes the color code "12" in the right-most column, i.e., the color code entry. The color code "12" is a reference to the color "light green" in the decoded color code table of FIG. 19*e*. Thus, the color light green is applied according to the information in row "1" of the color code table of FIG. 19*c* and the information in layer "0" of the table of FIG. 19*b*.

Figure 19D:
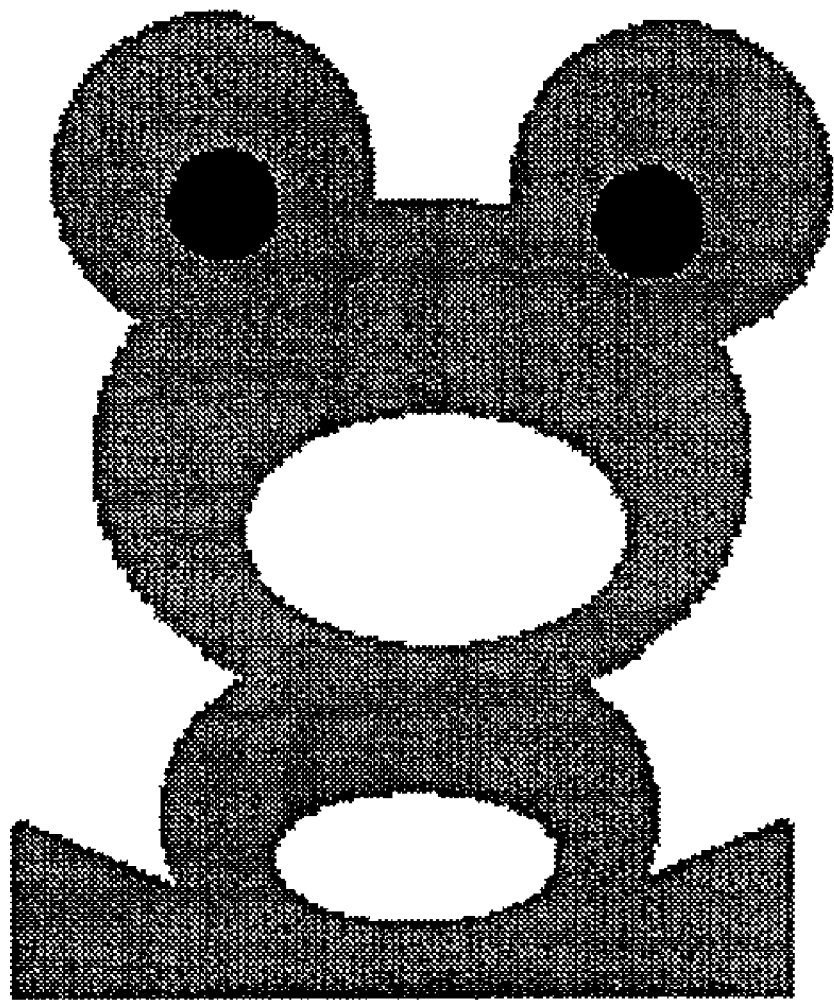
FIG. 19d is an illustration of a "frog" drawn by the geometric figures shown in FIGS. 19a–19c.

As shown in FIG. 19*d*, a frog is drawn based on the information in FIGS. 19*b*, 19*c*, and 19*e*. By default, the geometric figure is drawn as a black outline with no fill color. The following is a first technique for achieving a non-black fill color and outline. While colors are not shown in FIG. 19*d*, the main body parts of the frog are light green and the inner part of the eyes are black. To achieve a light green circle for the outer part of the eye, with a light green outline, i.e., no visible outline, the initially unfilled black outlined circle is first filled in back, and then the circle is filled in light green. As shown in FIG. 19*b*, the color table nos. "0" through "11" are present in layers 0 through 5, respectively. These color table nos. 0–11 correspond to rows 0–11 of the color table of FIG. 19*c*. As can be seen in FIG. 19*c*, the color codes of rows 0–11 alternate between "0" for "black" and "12" for "light green." This represents the chronological steps discussed above to achieve a light green circle with a light green outline.

For example, in layer 0 of FIG. 19*b*, which is the outer part of the left eye, the color table number entry is "0:01." The "0" portion of this entry is the first operation where the color table row 0 is referenced. Row 0 of the color table of FIG. 19*c* refers to color code 0 in the right most column. This is a reference to entry 0 in the decoded color code of FIG. 19*e*. The color code 0 represents the color black. The X and Y positions in row 0 of the color table are the X and Y position that was clicked by the user to select the area to be filled. This is some point inside the circle. This point is a somewhat random point in that it is any point inside the circle selected by the user. The importance is that the point is inside the circle. The X and Y positions are with respect to an X/Y coordinate system having its center at the center of the geometric figure, in this case the circle. Thus, the user clicks on any point inside the circle, selects the color black from a displayed color palette, and the circle is filled in black by the computer. The computer fills to the selected color all points that are contiguous to the selected point and that have the same color value. As seen in row 0 of FIG. 19*c*, the user clicked on point (−16, 6) in the X/Y coordinate system centered at the center of the circle.

Then, the second operation is the "01" of the "0:01" entry in layer 0 in FIG. 19*b*. The "01" is a reference to row 1 of the color table of FIG. 19*c*. Row 1 includes a reference to color code 12 in the right-most column. This number 12 is a reference to row 12 in the decoded color code table of FIG. 19*e*. As seen in FIG. 19*e*, the number 12 represents the color light green. Thus, the circle is filled in light green.

A second way of accomplishing a light green solid circle is for the user to select a point on the initially black outlined empty circle and select the color light green from the displayed color palette, followed by selecting any point on the interior and a section of light green from the color palette. This second way is somewhat more difficult in that it may be difficult for some users to be able to select a point on the relatively narrow outline of the geometric figure.

Since the color table nos. are stored in a sequential manner corresponding to the sequence of operations by the user, if a user wants to erase color afterward, the user can trace back one color table no. operation at a time to any operation all the way back to the original stage i.e. black edge and no color interior.

The inner part of the eyes of the frog are represented in layers 6 and 7 of FIG. 19b. These layers have only one color table no. entry. This is because the inner part of the eyes are black, not light green. For example, layer 6 has a color table entry of "12." As seen in FIG. 19c, row 12 refers to color code "0" which is "black." Since there is no second entry in the color table no. column for layer 6 in FIG. 19b, the circle remains black. Thus, the inner part of the eye is black. The same procedure is done for layer 7, which represents the second eye. Therefore, as shown in FIG. 19d, the inner part of the eyes of the frog are black.

The legs of the frog, which are light green, are represented by layers 4 and 5 of FIG. 19b. As can be seen by the "geometric figure" entry for layers 4 and 5 of FIG. 19b, the legs are made using triangles. The leg represented by layer 5 is a reversed version of the geometric figure shown in the geometric figure entry, as indicated by the "1" in the "reversed" entry for layer 5. The coloring procedure will be discussed with reference to layer 4. In layer 4, the color table no. entry is "8:09" which means that, first, the information of row 8 of FIG. 19c is applied, and then the information of row 9 of FIG. 19c is applied. Thus, since row 8 of FIG. 19c refers to color code 0 of FIG. 19e, the triangle is filled black. Then, by application of the information in row 9 of FIG. 19c, the triangle is filled light green because of the reference to color code 12 in row 9 of FIG. 19c, thereby eliminating the black outline.

The above information is automatically stored in the tables according to the data structure of the present invention. The user does not have to manually enter the numbers. Rather, the user simply selects the desired part of the picture and selects the desired color on a color palette displayed on the screen. The computer associates the position of the user's mouse point and enters the appropriate information into the tables according to the data structure of the present invention. Thus, in the example above, the user would select a circle from a graphically displayed list of geometric figures, choose the size and position, etc., by clicking and dragging the geometric figure, and a black outlined circle would appear at the position and size directed by the user. The computer would store the information of the mouse clicks as coded information in a layer, e.g., layer 0, of the table of FIG. 19b. The user would then click on any point inside the circle with the mouse and select the color black from the displayed color palette. The computer would store the information in a row, e.g., row 0, in the color table of FIG. 19c, including the X and Y position in the circle clicked by the user and the color code of the color black selected by the user from the displayed palette. The X/Y position are stored in FIG. 19c according to the X/Y coordinate system centered at the center of the geometric figure. This operation fills the circle black. Then the user would again click on the circle and select the color light green from the displayed color palette. The computer would store the mouse click information in a row, e.g., row 1, of the color table of FIG. 19c, including the X and Y position clicked by the user, and the color code of the color light green selected by the user from the displayed palette. This results in the circle, including the outline, being colored light green. The information about the colors is stored in accordance with the data structure described above, i.e., as coded information shown in the tables of FIGS. 19b, 19c, and 19e, not as an image file such as bit map.

Whenever the computer is instructed to reproduce the picture part, the computer uses the information shown in FIGS. 19b, c, and e, to generate the picture part. Thus, if the user selects the frog, the computer is instructed to produce the picture part No. 501, i.e., the frog, shown in FIG. 19b, the computer goes through the layers of the table producing the geometric figures with coordinates, size, rotation, reversed or not reversed, and colored in accordance with the information in FIGS. 19b, c, and e, so that the frog is drawn by the computer. No bit map or other image file is saved or opened in producing the frog, rather the information in the tables 19b, c, and e is relied on by the computer to draw all of the geometric figures that constitute the picture of the frog.

Figure 20A:
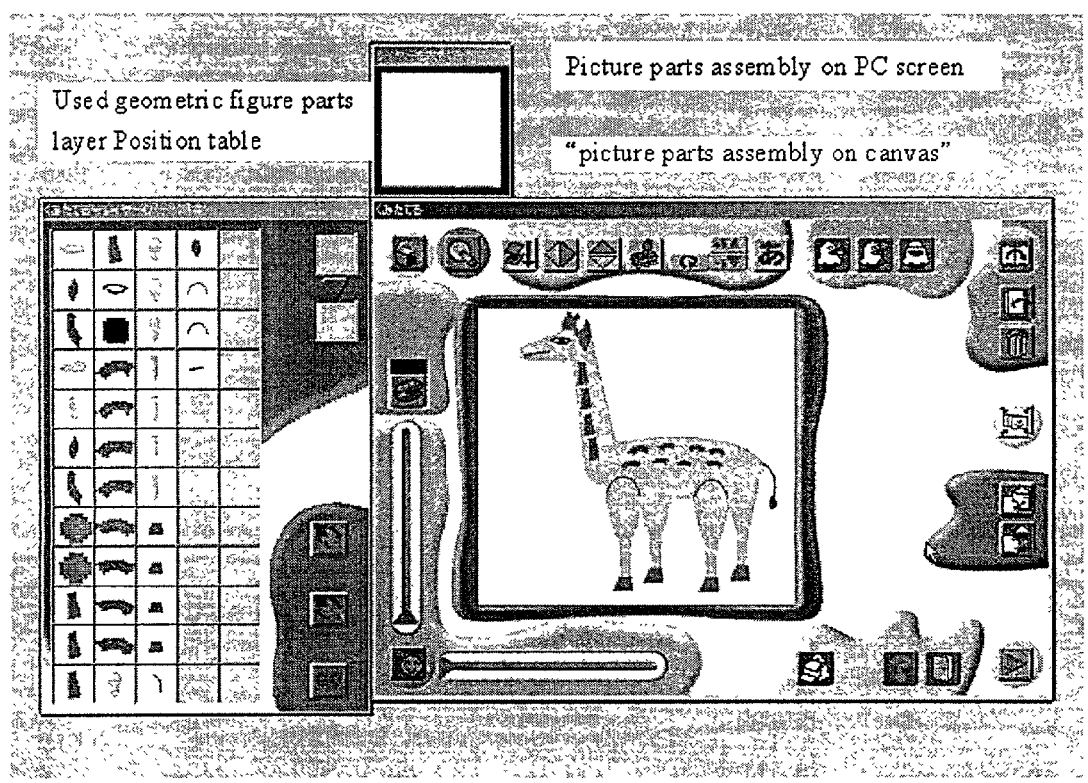
FIG. 20a is a computer display during the drawing of a "picture part" on the computer, picture parts of the picture, and a layer position table for drawing a "giraffe"
Figure 20D:
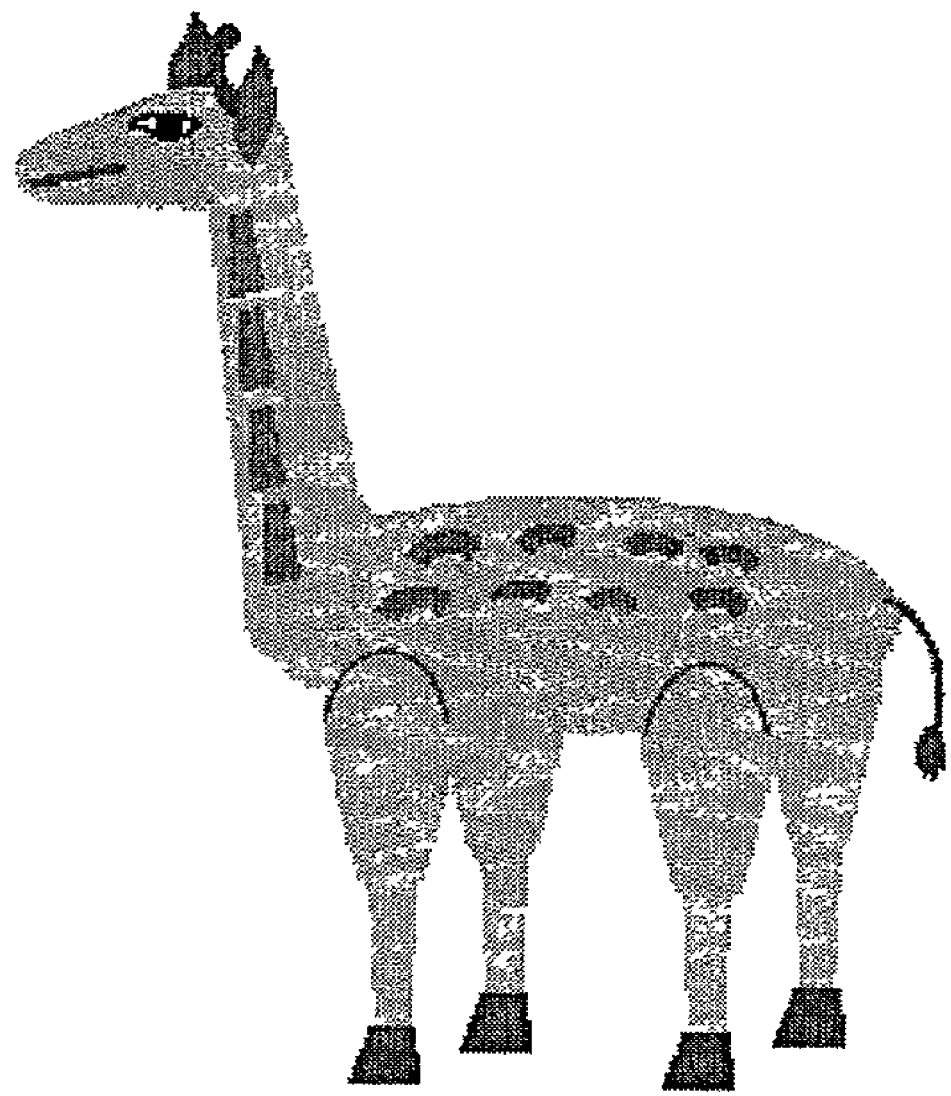
FIG. 20d is an illustration of a "giraffe" drawn by the geometric picture parts shown in FIGS. 20a–20c.

In FIGS. 20a–20e, a "giraffe" is drawn from a "picture parts" assembly and "used geometric figure parts" on the canvas 10. FIG. 20b shows the table of coded numbers arranged in accordance with the data structure of the present invention, which was described in detail above with respect to FIG. 19b. FIG. 20c shows the color table associated with the picture of the giraffe. The information is stored according to the data structure described in detail above with respect to FIG. 19c. FIG. 20d shows the finished picture of the "giraffe" and FIG. 19e shows the decoded color code table.

Figure 21A:
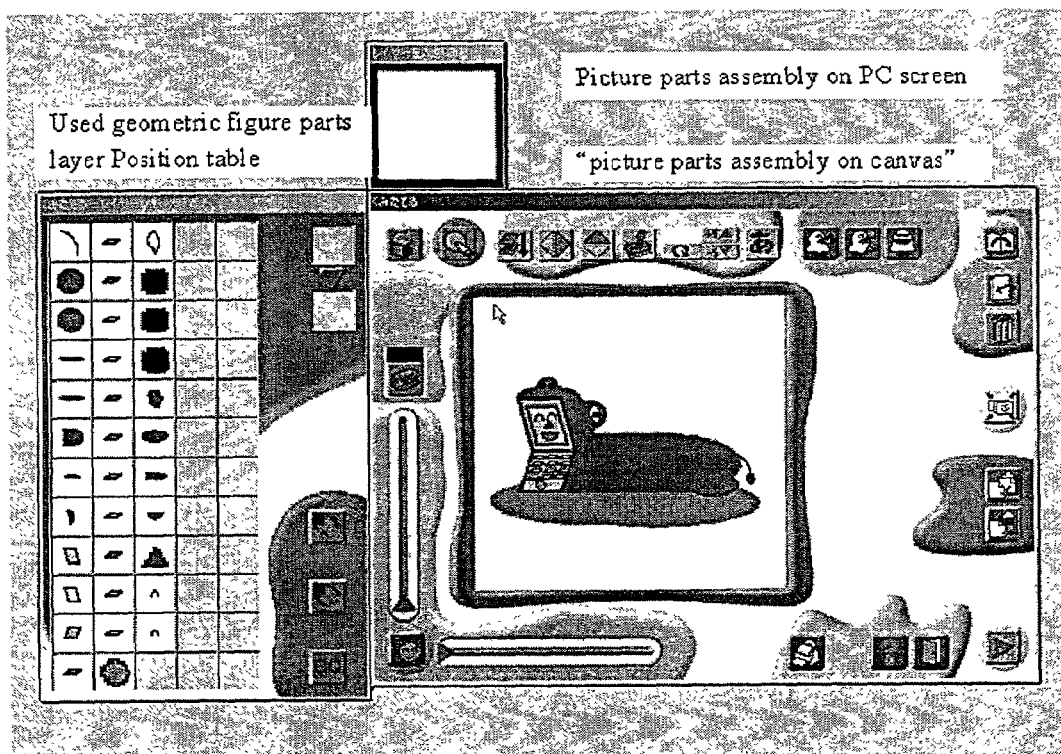
FIG. 21a is a computer display during the drawing of a "picture part" on the computer, picture parts, and a layer position table for drawing a "hippopotamus"
Figure 21D:
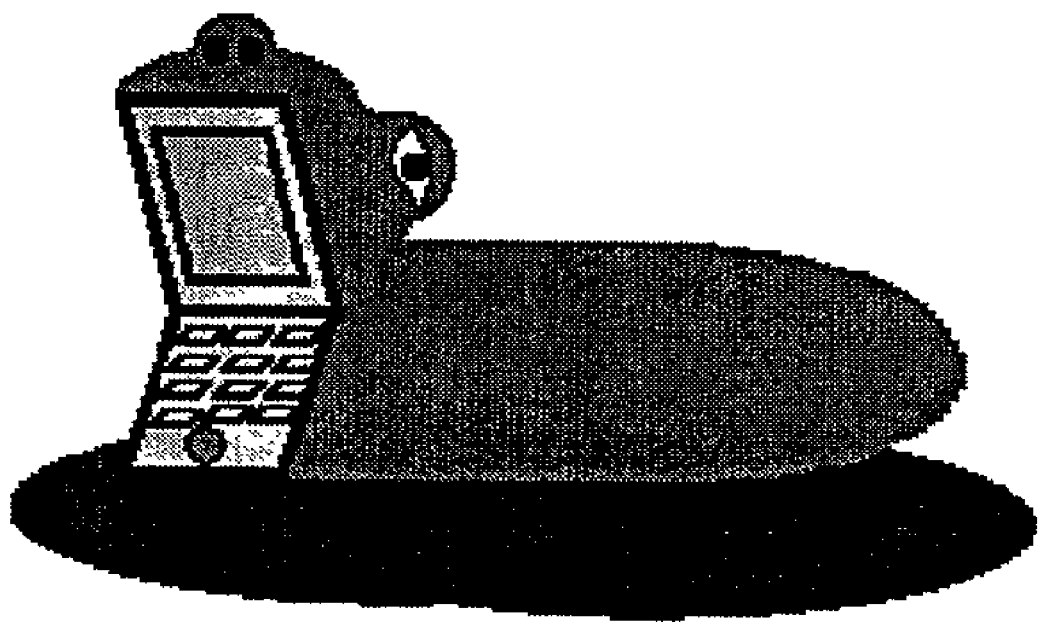
FIG. 21d is an illustration of a "hippopotamus" drawn by the geometric figures shown in FIGS. 21a–21c.

In FIGS. 21a–21e, a "hippopotamus" is drawn from a "picture parts" assembly and "used geometric figure parts" on the canvas 10. FIG. 21b shows the table of coded numbers arranged in accordance with the data structure of the present invention, which was described in detail above with respect to FIG. 19b. FIG. 21c shows the color table associated with the picture of the hippopotamus. The information is stored according to the data structure described in detail above with respect to FIG. 19c. FIG. 21d shows the finished picture of the "hippopotamus" and FIG. 21e shows the decoded color code table.

Figure 22A:
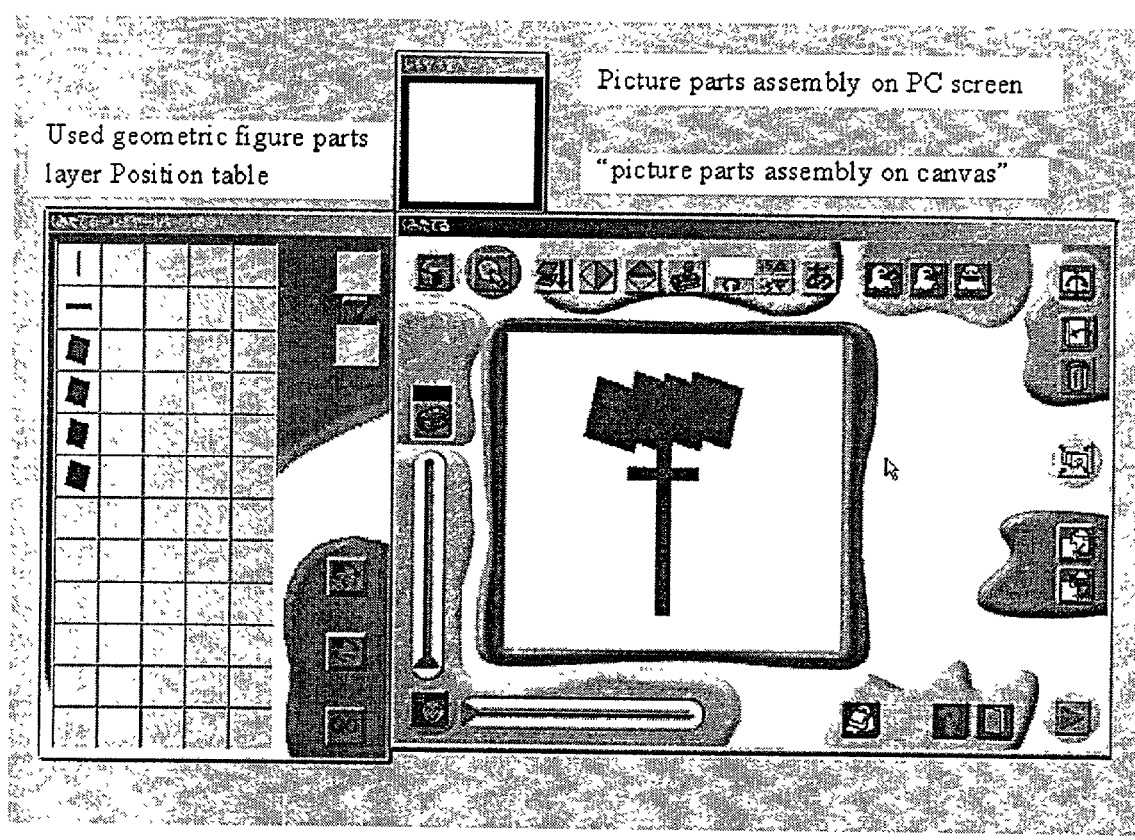
FIG. 22a is a computer display during the drawing of a "tree" on the computer, geometric figures, and a layer position table for drawing the "tree"
Figure 22D:
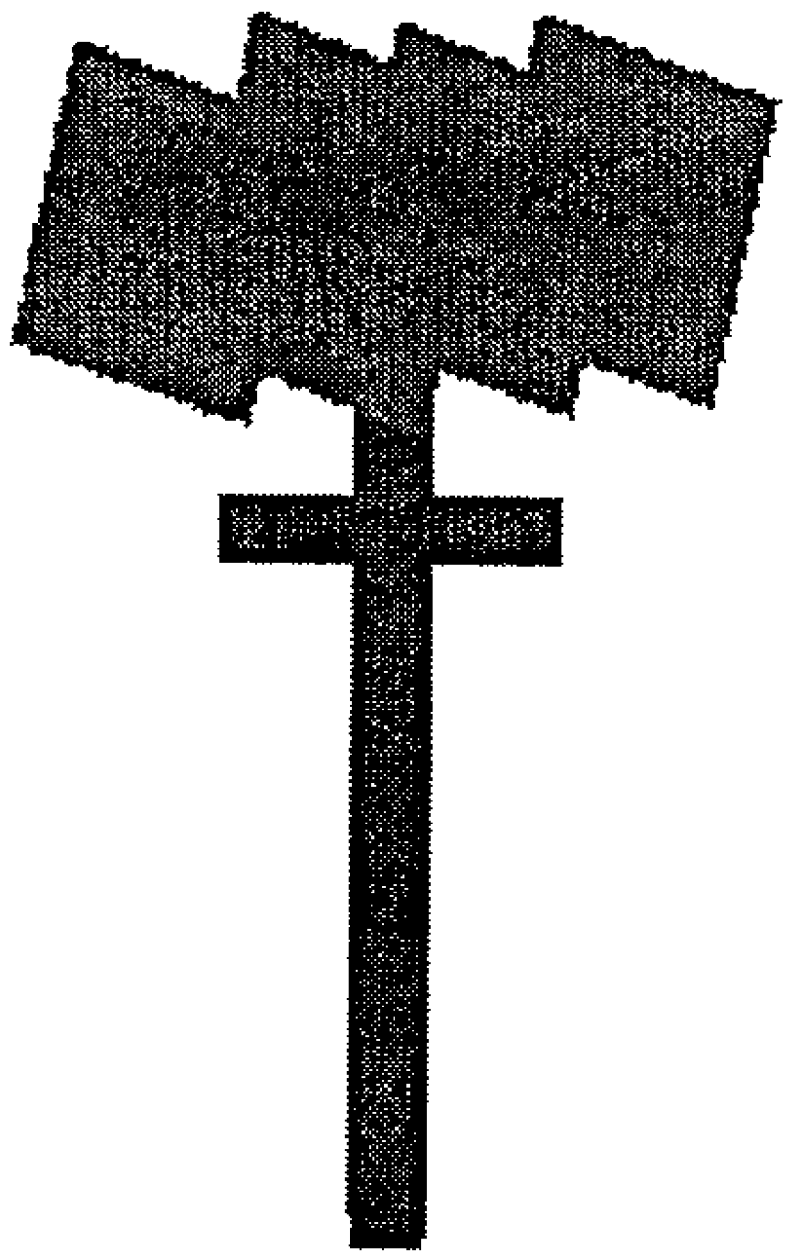
FIG. 22d is an illustration of a "tree" drawn by the geometric picture parts shown in FIGS. 22a–22c.

In FIGS. 22a–22e, a "tree" is drawn from a "picture parts" assembly and "used geometric figure parts" on the canvas 10. FIG. 22b shows the table of coded numbers arranged in accordance with the data structure of the present invention, which was described in detail above with respect to FIG. 19b. FIG. 22c shows the color table associated with the picture of the tree. The information is stored according to the data structure described in detail above with respect to FIG. 19c. FIG. 22d shows the finished picture of the "tree" and FIG. 22e shows the decoded color code table.

Figure 23A:
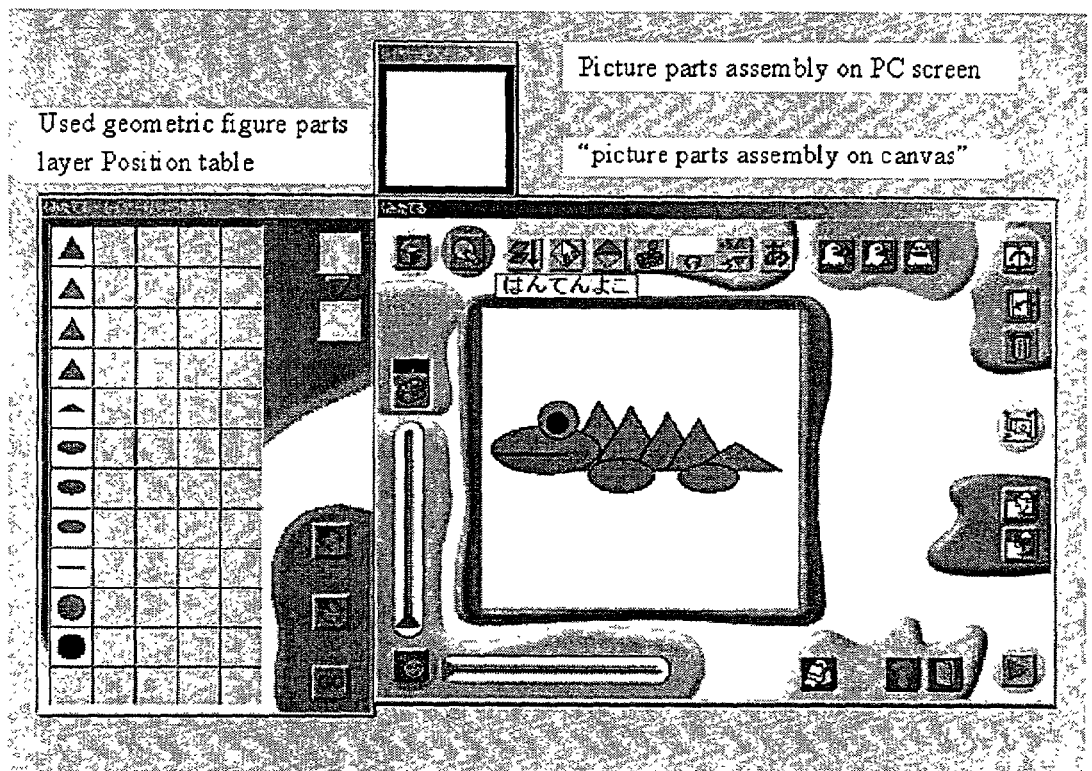
FIG. 23a is a computer display during the drawing of an "alligator" on the computer, geometric figures, and a layer position table for drawing the "alligator"
Figure 23D:
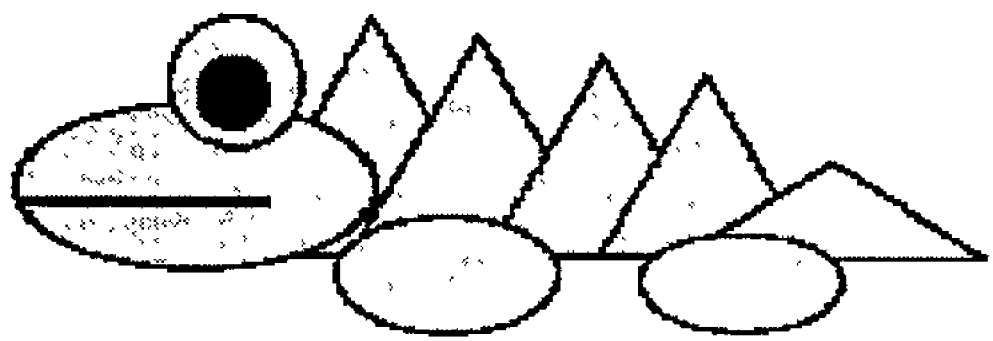
FIG. 23d is an illustration of an "alligator" drawn by the geometric figures shown in FIGS. 23a–23c.

In FIGS. 23a–23e, an "alligator" is drawn from a "picture parts" assembly and "used geometric figure parts" on the canvas 10. FIG. 23b shows the table of coded numbers arranged in accordance with the data structure of the present invention, which was described in detail above with respect to FIG. 19b. FIG. 23c shows the color table associated with the picture of the alligator. The information is stored according to the data structure described in detail above with respect to FIG. 19c. FIG. 23d shows the finished picture of the "alligator" and FIG. 23e shows the decoded color code table.

Figure 24A:
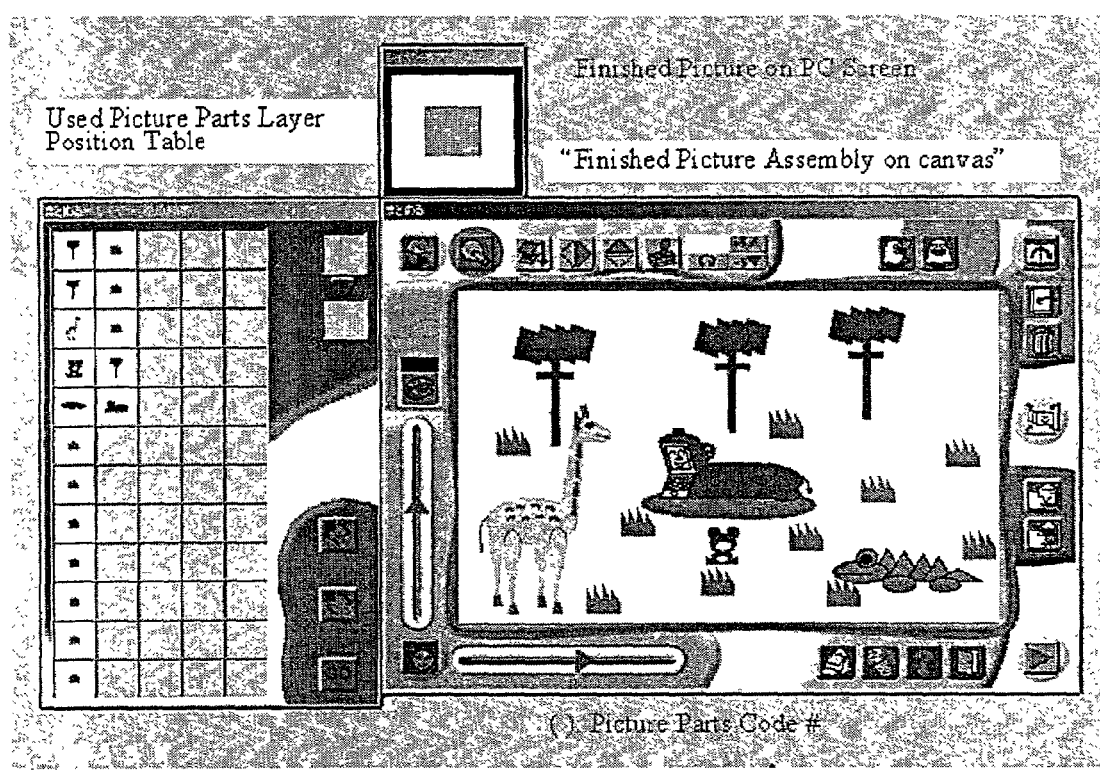
FIG. 24a is a computer display during the drawing of a "town" on the computer, picture parts, and a layer position table for drawing the "town"
Figure 24C:
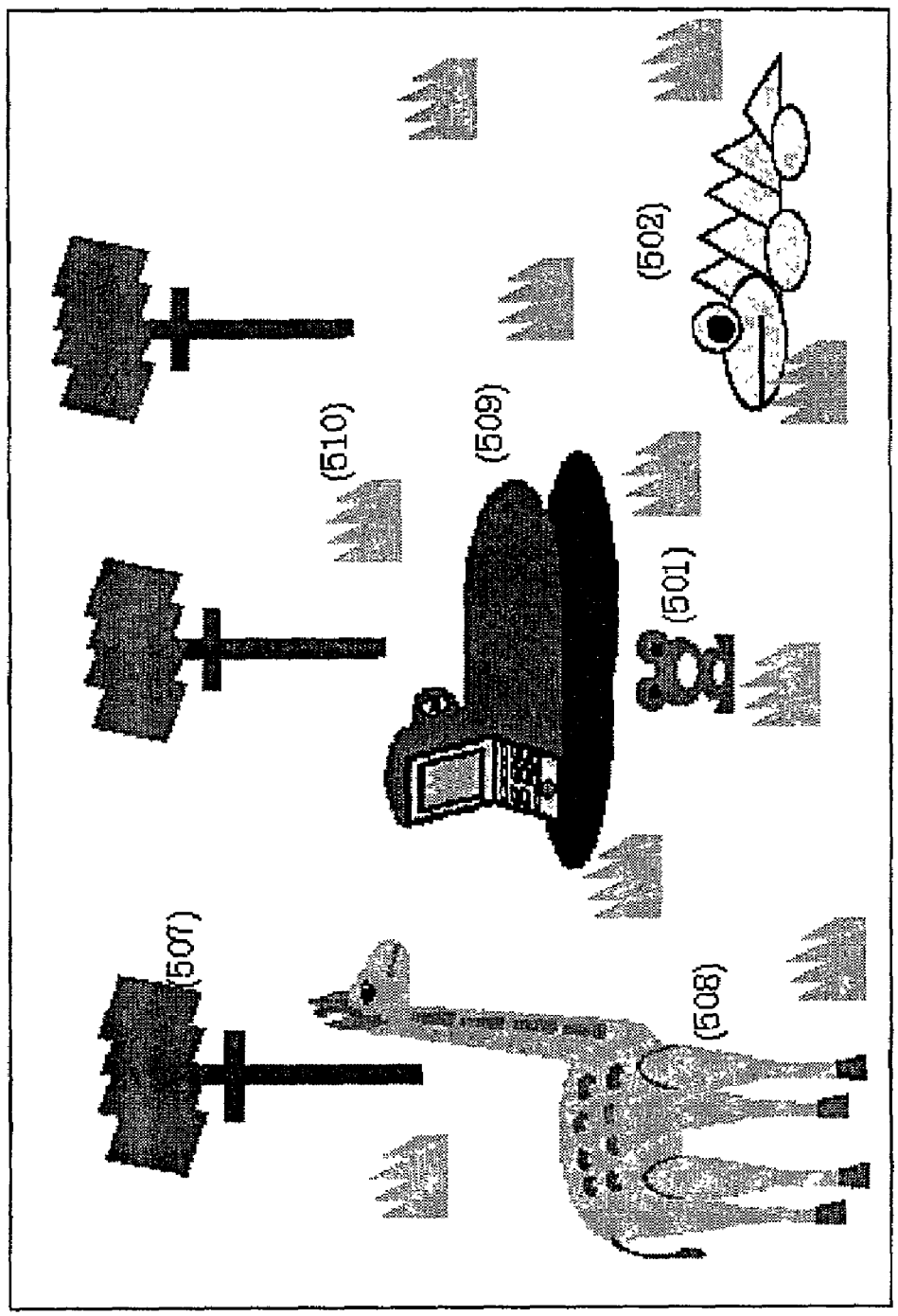
FIG. 24c is an illustration of a "town" drawn by the geometric figures shown in FIGS. 24a–24b.

In FIGS. 24a–24e, an "town" is drawn from a "picture parts" assembly and "used geometric figure parts" on the canvas 10. FIG. 24b shows the table of coded numbers arranged in accordance with the data structure of the present invention, which was described in detail above with respect to FIG. 19b. FIG. 24c shows the finished picture of the "town."

The encoded information, i.e., the coded numbers in the tables, is accessed by the computer in forming the shapes that make up the picture parts and the finished pictures. For example, if a picture part, or finished picture, includes a circle, the encoded information will include a parts code number that indicates that a circle is to be drawn, the x an y coordinates where the circle is to be drawn, the size of the circle, etc. according to the data structure of the present invention, which is described in detail with reference to FIG. 19c. The computer utilizes the encoded information as the parameters for drawing the desired shape.

Pictures stored as conventional image files, such as bitmaps, can be combined with the pictures, picture parts, or materials of the present invention. Thus, for example, a bitmap image of Mount Fuji can be used as a backdrop upon which the alligator shown in FIG. 23a can be placed. Further, conventional image files, such as bitmaps, can be selectively used in the implementation of the system, such as for displaying the pictures of the used geometric shapes in the window on the left side of the screen as shown in FIG. 19a for example.

Although this invention has been fully described by way of examples with reference to the accompanying drawings, it is to be noted that various changes and modifications will be apparent to those skilled in the art. Therefore, unless otherwise such change and modifications depart from the scope of this invention, they should be construed as being included therein.

We claim:

1. A picture drawing system for use with a computer having a memory, said picture drawing system comprising:
   a material file, in the memory of the computer, storing simple geometric patterns;
   a part file, in the memory of the computer, storing at least one picture part comprised of encoded information of one or more of the simple geometric patterns dragged and dropped from said material file, said picture part being stored in the memory in such a manner that each simple geometric pattern of said picture part is changeable so that said picture part is amendable and such that encoded information of additional geometric patterns from said material file can be added to said picture part and encoded information of one or more of the geometric patterns of the picture part can be removed;
   a finished picture file, in the memory of the computer, storing a finished picture comprised of encoded information of one or more of the picture parts dragged and dropped from said part file, said finished picture being stored in the memory in such a manner that each picture part of said finished picture is changeable so that said finished picture is amendable and such that encoded information of additional picture parts from said part file can be added to said finished picture and encoded information of one or more of the picture parts of the finished picture can be removed; and
   a plurality of logical layers, wherein a data structure of said logical layers includes coded data for said picture part in each layer, including a coded number indicating a layer number, a parts code number, x and y coordinates, a size in terms of an x and y distance, a rotation value, a reversed code, and a color code.

2. A picture drawing system according to claim 1, wherein the encoded information of the simple geometric patterns comprises a parts code number.

3. A picture drawing system according to claim 1, wherein the encoded information of each picture part includes a parts code number, a color code, coordinate codes, size codes, a rotation code, and a reverse code.

4. A picture drawing method for use with a computer having a memory and a display, said picture drawing method comprising:
   storing simple geometric patterns in a material file in the memory of the computer;
   displaying at least some of the simple geometric patterns on the display of the computer;
   forming at least one picture part by dragging and dropping on the display of the computer one or more of the simple geometric patterns stored in the material file;
   storing the at least one picture part in a part file in the memory of the computer as encoded information of each of the simple geometric patterns of the picture part and storing the at least one picture part in such a manner that each simple geometric pattern of each picture part is changeable so that each picture part is amendable and such that encoded information of additional geometric patterns from the material file can be added to each picture part and encoded information of one or more of the geometric patterns of the picture part can be removed;
   displaying the at least one picture part on the display of the computer;
   forming a finished picture by dragging and dropping on the display of the computer at least one picture part stored in the part file;
   storing the finished picture in a finished picture file in the memory of the computer as encoded information of one or more of the at least one picture part and storing the finished picture part in such a manner that each picture part of the finished picture is changeable so that the finished picture is amendable and such that encoded information of additional picture parts from the part file can be added to the finished picture and encoded information of one or more of the picture parts of the finished picture can be removed;
   displaying the finished picture on the display of the computer; and
   providing a plurality of logical layers, wherein a data structure of said logical layers includes coded data for said picture part in each layer, including a coded number indicating a layer number, a parts code number, x and y coordinates, a size in terms of an x and y distance, a rotation value, a reversed code, and color code.

5. A picture drawing method according to claim 4, wherein the encoded information of the simple geometric patterns comprises a parts code number.

6. A picture drawing method according to claim 4, wherein the encoded information of each picture part includes a parts code number, a color code, coordinate codes, size codes, a rotation code, and a reverse code.

7. A data structure, embodied on a computer-readable medium, for use with a computer, the data structure storing information enabling the computer to produce a picture part based on one or more simple geometric figures, said data structure comprising:
   a logical picture part table having a layer for each geometric figure to be produced by the computer in composing the picture part, each layer comprising:
      a parts code area for storing a numerical value representative of a simple geometric figure to be produced by the computer in composing the picture part;
      a color table number area for storing at least one color table reference value;
      an X coordinate area for storing a numerical value indicative of an X coordinate location at which the geometric figure is to be produced;
      a Y coordinate area for storing a numerical value indicative of a Y coordinate location at which the geometric figure is to be produced;

an X size area for storing a numerical value indicative of a size in an X direction at which the geometric figure is to be produced;

a Y size area for storing a numerical value indicative of a size in a Y direction at which the geometric figure is to be produced;

a rotation area for storing a numerical value indicative of an amount at which the geometric figure is to be rotated; and a reversed area for storing a numerical value indicative of whether an orientation of the geometric figure is to be reversed in the picture part; and a logical color table having one or more rows, each row comprising:

a color code table number area for storing a color table reference number;

an X position area for storing an X position;

a Y position area for storing a Y position; and a color code area for storing a color code indicative of a color to be applied in the picture part.

8. A data structure, embodied on a computer-readable medium, for use with a computer, the data structure storing information enabling the computer to produce a picture based on one or more picture parts, said data structure comprising:

a logical picture table having a layer for each picture part composing the picture, each layer comprising:

a picture part code area for storing a numerical value representative of a picture part to be produced by the computer in composing the picture;

an X coordinate area for storing a numerical value indicative of an X coordinate location at which the picture part is to be produced;

a Y coordinate area for storing a numerical value indicative of a Y coordinate location at which the picture part is to be produced;

an X size area for storing a numerical value indicative of a size in an X direction at which the picture part is to be produced;

a Y size area for storing a numerical value indicative of a size in a Y direction at which the picture part is to be produced;

a rotation area for storing a numerical value indicative of an amount at which the picture part is to be rotated; and a reversed area for storing a numerical value indicative of whether an orientation of the picture part is to be reversed in the picture.

9. A picture drawing system according to claim 1, wherein said picture part and said finished picture are stored in the memory systematically, exchangeably and removably by coded numbers, and are not stored as image files.

10. A picture drawing method according to claim 4, wherein said picture part and said finished picture are stored in the memory systematically, exchangeably and removably by coded numbers, and are not stored as image files.

11. A data structure according to claim 7, wherein said picture part is stored in the computer-readable medium systematically, exchangeably and removably by coded numbers, and are not stored as image files.

12. A data structure according to claim 8, wherein said picture is stored in the computer-readable medium systematically, exchangeably and removably by coded numbers, and are not stored as image files.

\* \* \* \* \*